(12) United States Patent
Sugahara et al.

(10) Patent No.: US 7,324,921 B2
(45) Date of Patent: Jan. 29, 2008

(54) CONTAINER INSPECTION SYSTEM

(75) Inventors: Byron M. Sugahara, Vero Beach, FL (US); Avrum A. Freelund, Glen Cove, NY (US); Hal B. Haygood, Sugar Land, TX (US); Robert A. Goertz, Sugar Land, TX (US); John Chester, Katy, TX (US); Stephen W. Poole, Houston, TX (US); Robert B. Stout, Jr., Houston, TX (US)

(73) Assignee: RFTrax Inc., Sugar Land, TX (US)

( * ) Notice: Subject to any disclaimer, the term of this patent is extended or adjusted under 35 U.S.C. 154(b) by 112 days.

(21) Appl. No.: 11/023,890

(22) Filed: Dec. 28, 2004

(65) Prior Publication Data

US 2007/0276619 A1   Nov. 29, 2007

(51) Int. Cl.
*G06F 19/00*   (2006.01)
(52) U.S. Cl. ...................... 702/183; 324/512
(58) Field of Classification Search ................ 702/183, 702/182, 184–185, 188; 250/336.1; 324/512
See application file for complete search history.

(56) References Cited

U.S. PATENT DOCUMENTS

| | | | |
|---|---|---|---|
| 5,712,789 | A | 1/1998 | Radican |
| 5,831,531 | A | 11/1998 | Tuttle |
| 5,898,370 | A | 4/1999 | Reymond |
| 5,903,134 | A | 5/1999 | Takeuchi |
| 5,959,433 | A | 9/1999 | Rohde |
| 6,069,563 | A | 5/2000 | Kadner et al. |
| 6,148,291 | A | 11/2000 | Radican |
| 2002/0138353 | A1 | 9/2002 | Kang et al. |
| 2003/0033851 | A1 | 2/2003 | Gelfman et al. |
| 2003/0069738 | A1 | 4/2003 | Casey et al. |
| 2003/0108150 | A1 | 6/2003 | Franke |
| 2003/0152193 | A1 | 8/2003 | Hodge |

(Continued)

FOREIGN PATENT DOCUMENTS

EP   0173920 A1   3/1986

(Continued)

*Primary Examiner*—Edward Raymond
(74) *Attorney, Agent, or Firm*—Patton Boggs LLP

(57) ABSTRACT

The container inspection system operates globally at container handling facilities around the world and includes at least one transport apparatus located at a container handling facility having a spreader or other framework for connecting and handling cargo containers of all shapes and sizes. The transport apparatus is in communication with a computer network including several computing devices that provide to the transport apparatus comparison data including load models, load signatures, weight profile, and sensory limits related to a particular container. Sensors can be located on the spreader, inside the container, and invasively through the container and provide scanned characteristic data that is compared to the comparison data to determine a pass status or a fail status for the container. Ancillary data and authority input may be provided to the system by outside sources, such as other inspection systems and governmental entities. The transport apparatuses then move the connected container to a first location if a pass status is determined and a second location if a fail status is determined. The computer network may include a global host computer, a local host computer, and a local transport computer and employs expert system methodology.

48 Claims, 18 Drawing Sheets

U.S. PATENT DOCUMENTS

| | | |
|---|---|---|
| 2003/0160701 A1 | 8/2003 | Nakamura et al. |
| 2003/0164763 A1 | 9/2003 | Hisano et al. |
| 2003/0201394 A1 | 10/2003 | Peoples |
| 2004/0015418 A1 | 1/2004 | Dooley et al. |
| 2004/0041705 A1 | 3/2004 | Auerbach et al. |
| 2004/0041706 A1 | 3/2004 | Stratmoen et al. |
| 2004/0046660 A1 | 3/2004 | Ando et al. |
| 2004/0066328 A1 | 4/2004 | Galley, III et al. |
| 2004/0073808 A1 | 4/2004 | Hewitt et al. |

FOREIGN PATENT DOCUMENTS

| | | |
|---|---|---|
| EP | 1324241 A1 | 7/2003 |

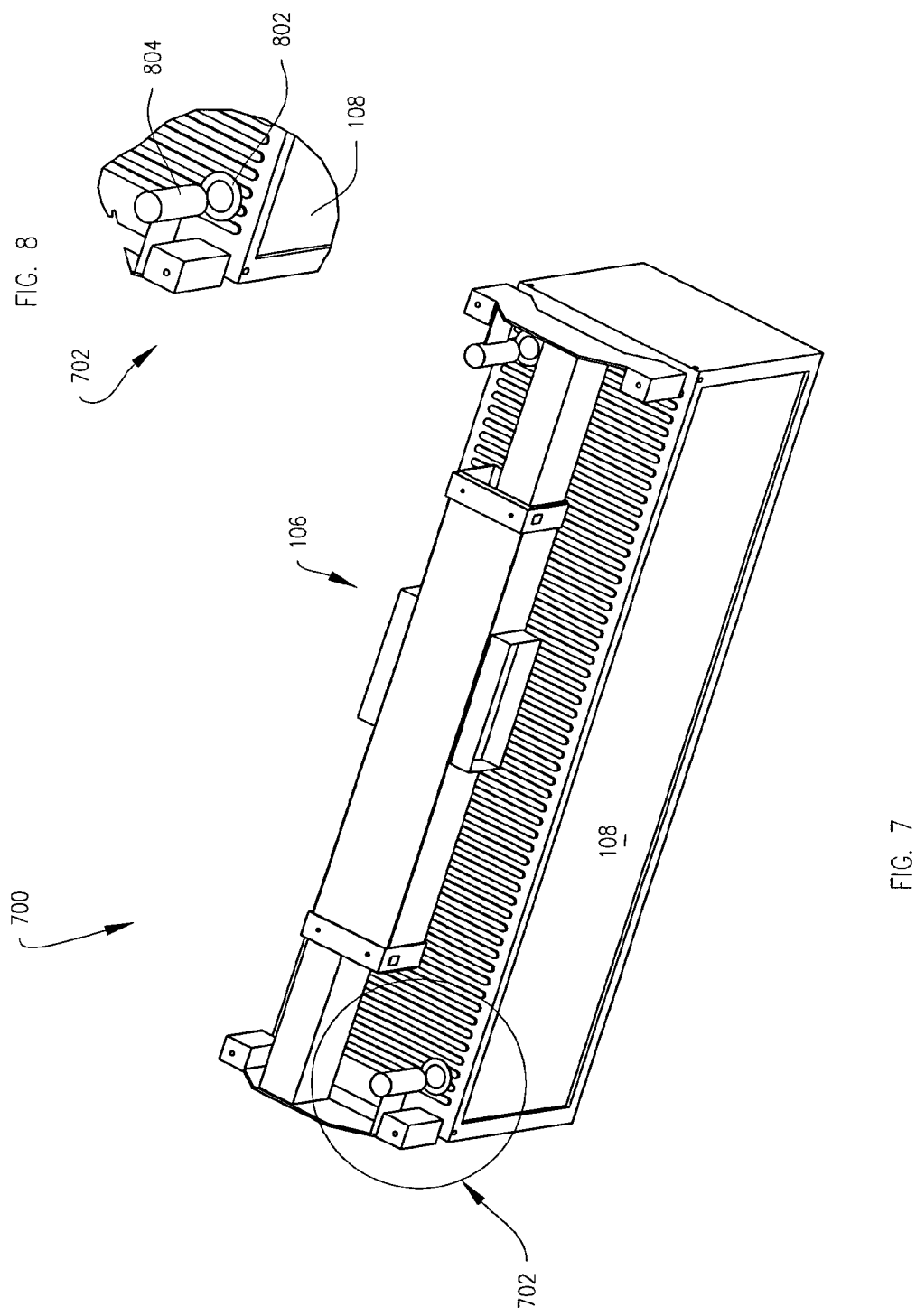

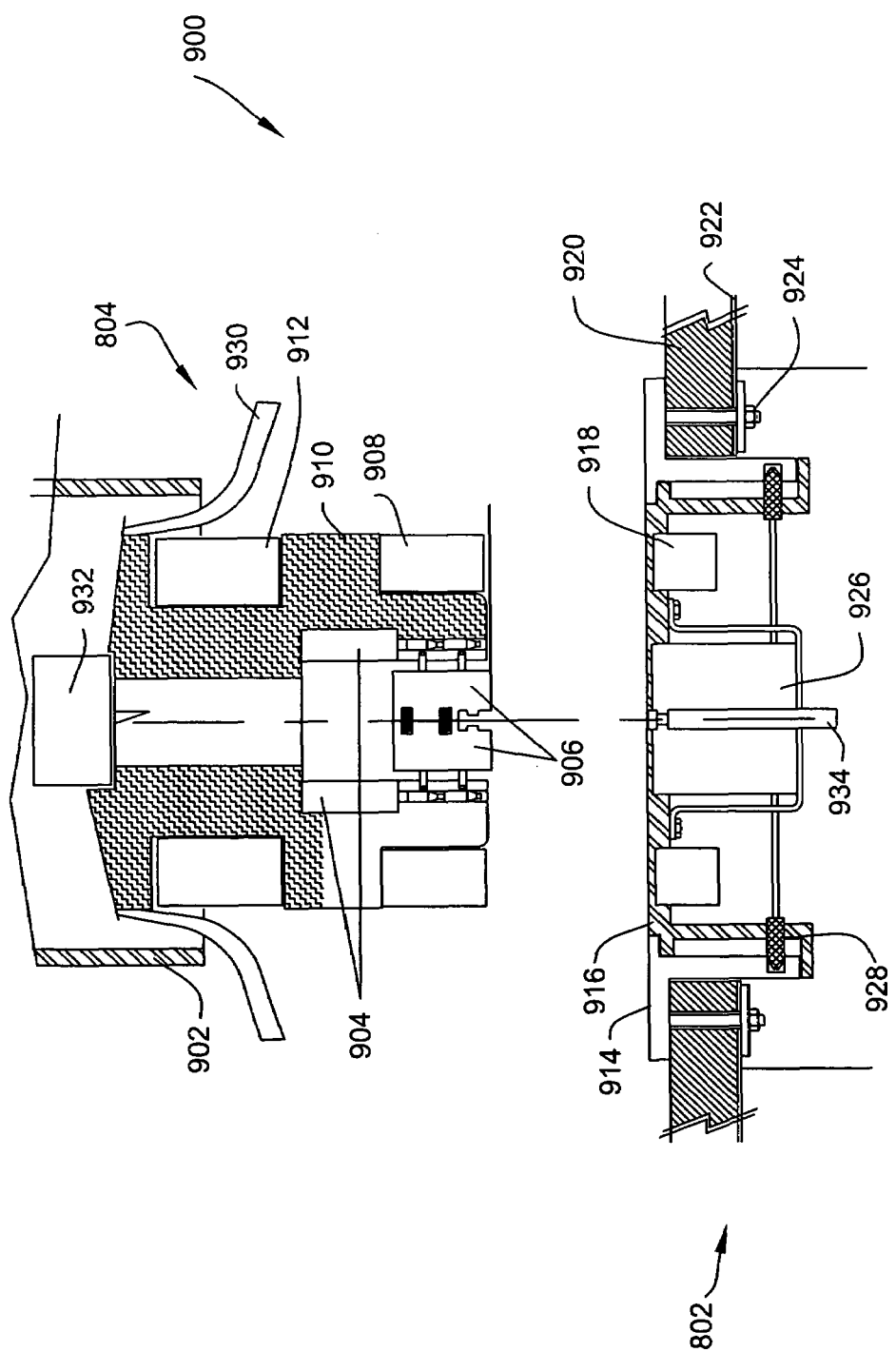

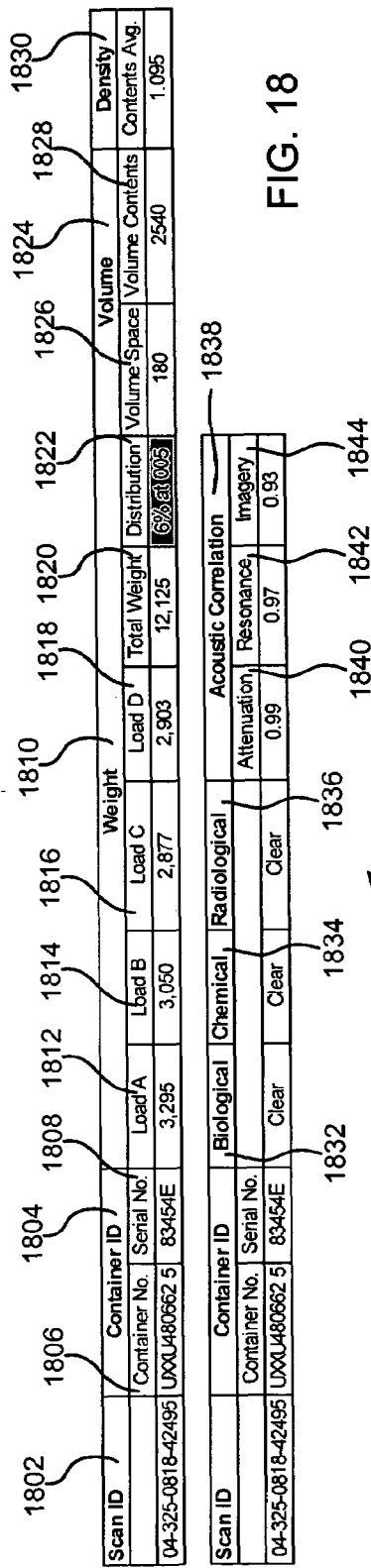
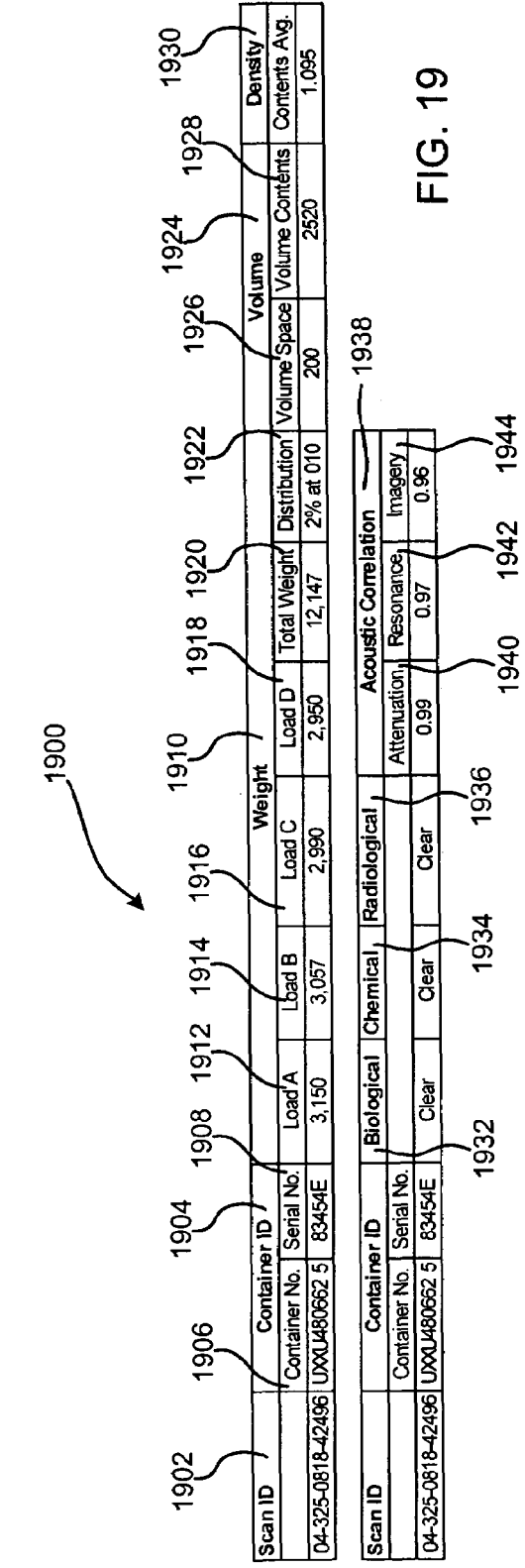
FIG. 18
FIG. 19

| Scan ID | Container ID | | | Weight | | | Volume | | Density |
|---|---|---|---|---|---|---|---|---|---|
| | Container No. | Serial No. | Load A | Load B | Load C | Load D | Total Weight | Distribution | Volume Space | Volume Contents | Contents Avg. |
| 04-325-0818-42497 | UXXU480662 5 | 83454E | 3,150 | 3,057 | 2,990 | 2,950 | 12,147 | 2% at 010 | 200 | 2520 | 1.095 |

| Scan ID | Container ID | | Biological | Chemical | Radiological | Acoustic Correlation | | |
|---|---|---|---|---|---|---|---|---|
| | Container No. | Serial No. | | | | Attenuation | Resonance | Imagery |
| 04-325-0818-42497 | UXXU480662 5 | 83454E | Clear | Clear | Clear | 0.99 | 0.97 | 0.95 |

| Scan ID | Container ID | | | Weight | | | Volume | | Density |
|---|---|---|---|---|---|---|---|---|---|
| | Container No. | Serial No. | Load A | Load B | Load C | Load D | Total Weight | Distribution | Volume Space | Volume Contents | Contents Avg. |
| 04-325-0818-42498 | UXXU480662 5 | 83454E | 3,150 | 3,057 | 2,990 | 2,950 | 12,147 | 2% at 010 | 180 | 2540 | 1.095 |

| Scan ID | Container ID | | Biological | Chemical | Radiological | Acoustic Correlation | | |
|---|---|---|---|---|---|---|---|---|
| | Container No. | Serial No. | | | | Attenuation | Resonance | Imagery |
| 04-325-0818-42498 | UXXU480662 5 | 83454E | Clear | Clear | Clear | 0.99 | 0.97 | 0.93 |

CONTAINER INSPECTION SYSTEM

FIELD OF THE INVENTION

This invention relates to a container inspection system and in particular to a multi-modal sensor spreader and computer system for efficiently inspecting cargo containers during handling operations at ports and other cargo destinations.

PROBLEM

The number of shipping containers, either used by rail, dray, over-the-road, or sea-going vessel is steadily increasing each year. Enhanced container inspection technologies to maintain port of entry throughput as volume increases are urgently needed for national security and the protection of world commerce. Further, for reasons of economy and manpower, containers cannot be delayed or opened unless a high degree of certainty exists that the container and its contents must be removed from the flow of goods.

There has long been a recognition that the world's countries are at risk of the delivery of deleterious and hazardous materials, including chemical weapons, nuclear weapons, and biological weapons, to their ports and borders by those seeking to cause harm to a particular country by hiding such materials in shipping containers, including those containers commonly carried by ships, trains, and trucks. Various technologies have been employed to inspect these containers at a particular country's ports or borders.

The widespread use of intermodal shipping containers in international trade presents significant problems with regard to preventing the movement across international borders of various forms of contraband in these containers. Such contraband could range from the relatively innocuous, such as otherwise legal goods mis-described in order to evade customs duties, to explosives and weapons, including weapons of mass destruction capable of wreaking nuclear, radiological, chemical, or biological havoc on many people.

If the problems of fatigue and inattention generated by the repetitive work, as reported for airport screeners, are addressed, full manual inspection (opening, emptying, examining, restowing, and resealing) of every container moving through a particular port or terminal could be effective. However, the demands it places on inspection resources as well as its disruptive effect on commerce severely limit the number of such inspections which can be performed. Some known systems employ portable handheld devices used by border inspectors to communicate to a central computer particular information regarding a container under inspection by the inspector.

Presently, port inspectors are beginning to use newly developed x-ray and gamma ray imagers to see into containers. Typically, x-ray imagers require a radiation source transmitting device to be located on one side of a container and a radiation detection device located on the other side of the container. This requires the removal of personnel from the vehicle while scanning the container with x-rays, gamma rays, thermal or pulsed fast neutrons capable of penetrating the container walls. These devices are generally quite large and bulky and a container must be passed between these devices to be scanned. Due to the slowness inherent in using these imagers, port inspectors can not inspect each and every container that comes into a port, so they must rely on conventional screening aides such as trained dogs, profiling, and random selection, to help choose which containers to image. Currently, the U.S. Customs Service is utilizing several gamma-ray inspection systems and at least one pulsed fast neutron analysis (PFNA) detection device for the inspection of containers previously identified as high risk that cross its borders.

Further solutions have been conceived and in some cases developed that attempt to solve the problems associated with physical inspection by human beings. One known system employs non-metallic inserts that fit within a container and which are pulled out with the contents of the container for visual and sensor detection. Other systems employ an electronic seal and a communications device that transmits data related to the condition of the seal to a central station. These systems provide limited information and are generally operated away from the main handling operations at a port or facility. Still other systems employ containers having a plurality of intrusion detector panels adjacent to or incorporated within the main walls and doors of the container, such that a breach of the sealed container would be recorded on a memory device for later downloading. Further still, systems are known that monitor the insides of a container through the use of motion detectors, so as to determine if objects change within the container or if unauthorized access to the inside of the container has occurred. These systems are limited by the amount of information that they provide to a central station.

It is also known to place sensors and communications links inside containers for measuring the characteristics of the contents of the container and for detection of intrusion into the container while in transit. The communications link transmits the measured characteristics or intrusion status to a central data station, either immediately or upon the next opportunity in proximity with a central data station. This technology does not address inspecting those containers that do not have the sensors and communication links within the container.

Information relevant to attempts to address these problems can be found in U.S. Pat. App. Pub. Nos. US2004/0041706 filed Apr. 11, 2003 by Stratmoen et al.; US2004/0046660 filed Jul. 8, 2002 by Ando; US2003/0160701 filed Aug. 27, 2002 by Nakamura et al.; US2003/0164763 filed Jul. 23, 2002 by Hisano et al.; US2004/0066328 filed Jun. 5, 2003 by Galley, III et al.; US2003/0069738 filed Oct. 5, 2001 by Casey et al.; US2003/0033851 filed Aug. 10, 2001 by Gelfman; US2003/0152193 filed Dec. 24, 2002 by Hodge; US2002/0136353 filed Feb. 28, 2001 by Kang et al.; US2004/0041705 filed Aug. 27, 2002 by Auerbach et al.; and U.S. Pat. Nos. 6,148,291 issued Nov. 14, 2000 to Radican; 5,831,531 issued Nov. 3, 1998 to Tuttle; and 5,712,789 issued Jan. 27, 1998 to Radican; 6,069,563 issued May 30, 2000 to Kadner, et al.; and 5,898,370 issued Apr. 27, 1999 to Reymond. However, each one of these references suffers from one or more of the following disadvantages: redundant and time consuming data entry, limited statistics, limited portability, lack of artificial intelligence and expensive applications.

Therefore, there is a need for a container inspection system that facilitates efficient inspection during transportation and handling of different types of containers without the necessity of employing non-efficient, bulky, and expensive methods of inspection that involve diverting the containers from their normal path.

SOLUTION

The foregoing problems are solved and a technical advance in the art is achieved by the present container inspection system. The present container inspection system comprises a global system for acquiring and communicating data regarding the characteristics of containers being handled at container handling facilities or ports around the world to provide efficient inspection of the containers. At these container handling facilities, the present container inspection system uses a host of container transport apparatuses having spreaders with a plurality of sensors preferably located on or within the container and on or around the spreader for connecting, handling and scanning a host of containers.

The present container inspection system uses the necessarily occurring uniform interface between the container and the various container lifting spreaders (in cranes primarily, and in stackers, carriers, etc.) both to carry out automated inspections and tests on the container and its contents and to collect and transmit for analysis the data produced by such automated inspections and tests. All this is carried out in the normal course of the container's movement and handling, without delay or diversion of containers which are cleared. The accurately repeatable location of the spreader relative to the container when the lifting fittings on the spreader engage the corner castings on the container permits the establishment of secondary interfaces which include those between sensing devices in or on the container and receivers on the spreader.

The container inspection system employs the interface between the container and the various container lifting spreaders (in cranes primarily, and in stackers, carriers, etc.) to affect the various inspections and tests performed by the sensors located on the spreader or transport apparatus, on the container, or inside the container. In an embodiment, the characteristic data obtained from these inspections and tests is then communicated from these sensors to a local transport computer located on the spreader or transport apparatus where it is evaluated against comparison data regarding that particular container and contents or type of container and contents. If the scanned characteristic data corresponds with the comparison data, then the transport apparatus moves the container to its next intended location along its route to its final destination. If the scanned characteristic data does not correspond with the comparison data, then the transport apparatus moves the container to a location for further inspection. Any number of transport apparatuses having a local transport computer and spreaders with sensors may be employed in the present container inspection system.

Also at each container handling facility is preferably a local host computer that communicates directly with each local transport computer for providing the local transport computer with the comparison data regarding the containers that are handled by the transport apparatuses at each container handling facility. The local host computer also receives the scanned characteristic data from the local transport computer that is produced by the sensors on the spreader, transport apparatus, or container during the handling and scanning of the container. Additionally, information regarding containers at a container handling facility is communicated to the local host computer from sources such as freight packers and consolidators. This information may comprise bills of lading and cargo manifests. The local host computer may also receive ancillary data such as from other inspection systems that can be used in the inspection and comparison of containers for declared contents. The local host computer may also accept and honor authoritative inputs from various governmental agencies as to the handling of specific containers that are known to be entering a container handling facility.

In addition to the local host computer, in one embodiment the present container inspection system further includes a global host computer which generally acts as a server to all of the local host computers. It provides the local host computers with comparison data generally related to the physical characteristics of each container loaded with specific contents. It further provides information to each of the local host computers on how to evaluate characteristics observed or measured during container handling, transportation, and storage against what should be exhibited by a particular container. This comparison data takes several forms, such as load models, load signatures, weight profiles, and sensory limits, discussed further in the detailed descriptions. The global host computer further utilizes expert system methodology to employ and further develop its knowledge base. It utilizes this knowledge with subsequent scanned characteristics of a container loaded with a specific cargo to continually refine the comparison data that accurately defines the characteristics to be exhibited or expected by a certain type or model of container loaded with a known set or type of contents or cargo under various environmental conditions.

An extensive set of scanned characteristic data will be generated for each container by the combined use of many different sensors during inspection. These scanned characteristic data of the container and its contents are preferably compared with the comparison data supplied by the global host computer to determine the following: 1.) do the contents of the container match the Bill of Lading listed for that container and 2.) are these contents non-hazardous? If so, then the container is stated to be in good standing and can continue along its transport path. If the contents vary from the Bill of Lading then the container is stated to be in violation. Additionally, the container will be scanned for dangerous or hazardous materials. If any such materials are detected, then the container is stated to be in violation. Dangerous material means any material that could cause physical damage to the shipping container or its surroundings. Hazardous material means, though not exclusively, chemical or biological materials that are harmful to any living thing.

In one embodiment, the global host computer provides the comparison data upon request to the local host computer to be used in evaluating containers in normal handling that are reported to have certain contents against a refined set of characteristics that they should exhibit when loaded with such contents. The global host computer transmits data to the local host computers upon request and receives data from the local host computers online, and processes data offline.

A wide variety of sensor types is available, including nuclear, biological, and chemical (NBC) sensors for detecting the presence of hazardous or dangerous materials, proximity sensors for monitoring the position of contents or surfaces of the container, infrared sensors for measurement and imaging of temperature, motion sensors for detecting the presence of living beings, and light sensors for detection of intrusion, among others. New technologies with smaller, lower power, networked sensor technology is rapidly emerging that allows a multiplicity of sensors to be installed inside or outside the container that communicate with each other as well as with data collectors outside the container, such as associated with the spreader or the transport apparatus that is transporting the container, or associated with a vehicle transporting the container. The present system utilizes such available technologies to collect the scanned characteristic data for each container and its contents. This scanned characteristic data is shared within the system worldwide for the purpose of developing extensive expert system ability to distinguish between actual and manifested contents of a container with little or no impact upon the movement of the container along its intended route.

Another aspect of the container inspection system is the utilization of acoustic sensors for detecting anomalies such as might indicate the presence of living beings or other contents inconsistent with declared contents. These acoustic sensors are also used with active acoustic radiation sources for the purpose of imaging of the container contents as well as determining characteristics of the physical makeup of the contents.

The present container inspection system uses these acoustic methodologies to evaluate the nature of contents inside an intermodal freight container against the stated contents and to monitor for changes in those contents after the container has been sealed Yet another feature of the container inspection system is the determination of a weight profile of the container and contents. In one embodiment load cells or similar devices are incorporated into the four spreader lifting fittings in order to determine the container's total weight and location of its center of gravity. In another embodiment, strain gauges are affixed to the spreader or other framework that lifts the container at points of high yield to determine the weight and center of gravity. This measured data along with other sensory information such as strain measurement in the container walls and vibration measurement of the container structure is used to determine the unique weight profile of the container and contents. This information will be compared with theoretical data derived from previously reported contents and loading in order to detect mismatches between actual and manifested stowage.

Further, another feature of the container inspection system is analyzing data collected, using cargo manifest information to establish purported container lading, and comparing actual data with baseline data for such purported ladings using techniques to detect anomalies between actual and manifested stowage.

SUMMARY

The present container inspection system includes at least one transport apparatus having a spreader or other framework for connecting and handling cargo containers of all shapes and sizes. In one embodiment, the transport apparatus includes a local transport computer that communicates with several sensors that are attached to the spreader, the transport apparatus, or the container. Furthermore, the local transport computer also communicates with sensors internal to the container.

The local transport computer compares scanned characteristic data it receives from the sensors with comparison data related to that particular container that has been downloaded from the local host computer. If the scanned characteristic data that is produced by the sensors matches the comparison data, and substantially matches preset sensory limits for the scanned characteristic data, then the transport apparatus moves the container to its next location along its route of travel. If the scanned characteristic data does not match the comparison data, or substantially match preset sensory limits for the scanned characteristic data, then the transport apparatus moves the container to a location where it can be further inspected. The local host computer then uploads the scanned characteristic data regarding containers that have been inspected to be collected by the global host computer. The local host computer further uploads data regarding containers from many sources, including governmental authorities, manufacturers, and other ports and container handling facilities.

A global host computer communicates with all local host computers to provide a number of functions, including downloading to a local host computer comparison data comprising analyzed physical data related to a particular container and/or its contents, receiving from the local host computer scanned characteristic data acquired from the sensors located on the spreader of each transport apparatus, and processes data offline to improve the comparison data characterizing each container along with the specific contents of that container.

Further, a global host computer analyzes subsequent scanned characteristic data for a particular container containing a particular load to produce a load signature that is communicated throughout the present container inspection system. In addition, a global host computer communicates a load model for a particular type of container and description of contents throughout the present container inspection system.

These and other features, aspects, and advantages of the present container inspection system will become better understood with regard to the following description, appended claims, and accompanying drawings.

BRIEF DESCRIPTION OF THE DRAWINGS

FIG. 7 illustrates a perspective view of a typical container having two portals engaged with a typical spreader having an invasive probe located at the portals for sampling the typical container of the present container inspection system;

FIG. 8 illustrates a perspective view of a typical portal and invasive probe arrangement of the present container inspection system;

FIG. 9 illustrates a cross-section view of an invasive sensor disengaged from a portal of the present container inspection system;

FIGS. 18-21 illustrate exemplary scanned characteristic data from successive scans of a certain container loaded and secured with certain contents.

DETAILED DESCRIPTION OF THE DRAWINGS

Figure 1:
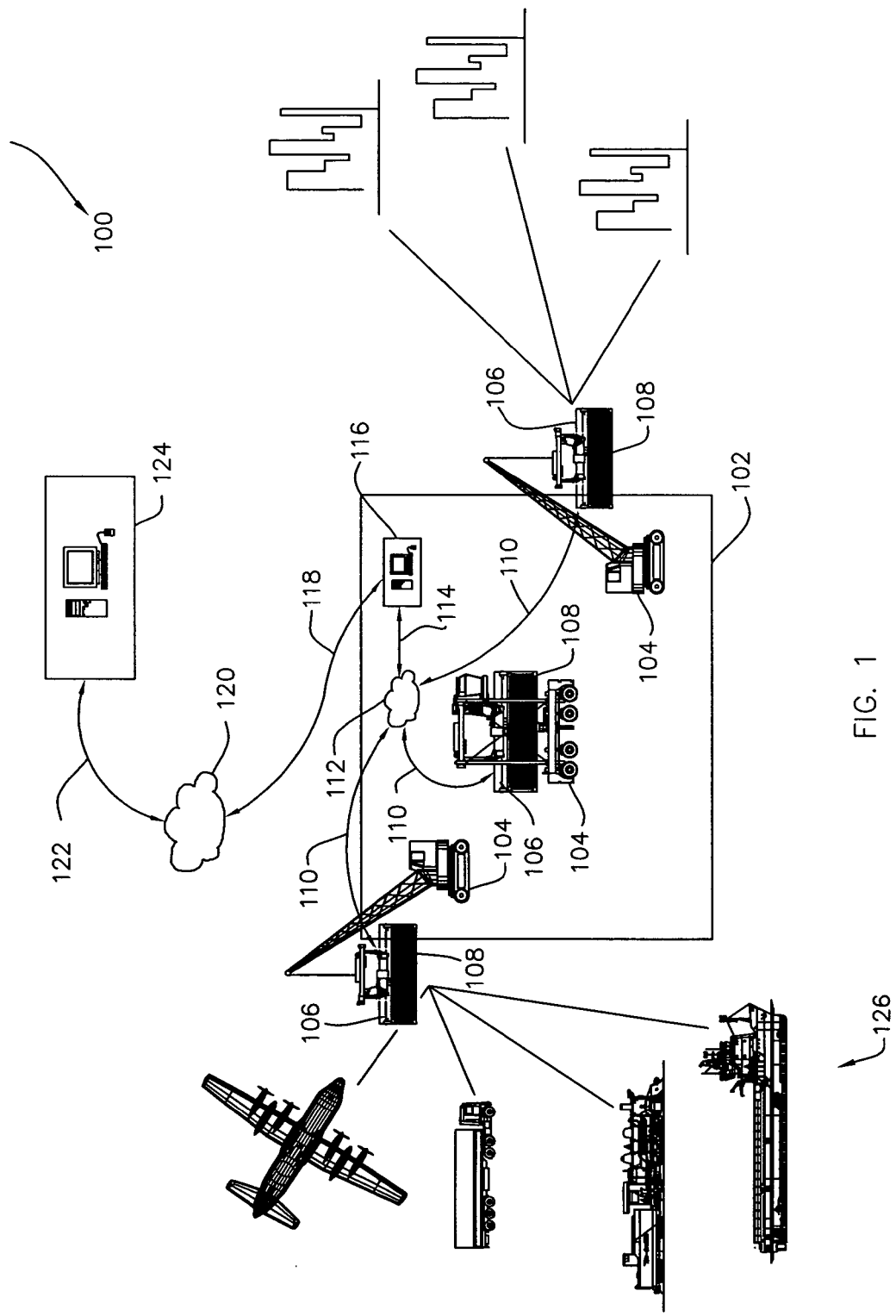
FIG. 1 illustrates in pictorial diagram form the overall architecture of the present container inspection system.

In the normal course of intermodal freight transportation, containers are handled and lifted repeatedly by various types of container handling apparatuses, such as cranes equipped with connecting devices, such as spreaders. These spreaders have lifting fittings for connecting with the corner castings of the container. Once connected, the crane then lifts the container and moves the container to a desirable location. The present container inspection system uses this necessarily occurring uniform interface between the container and the various container lifting spreaders both to carry out automated inspections and tests on the container and its contents and to collect and transmit for analysis the data produced by such automated inspections and tests. All this is carried out in the normal course of the container's movement and handling, without delay or diversion of containers which are cleared. The accurately repeatable location of the spreader relative to the container when the lifting fittings on the spreader engage the corner castings on the container permits the establishment of secondary interfaces which include those between sensors in or on the container and receivers on the spreader.

The container inspection system employs the interface between the container and the various container lifting spreaders to affect the various inspections and tests and perform the data analyses described below. The present container inspection system uses at least one transport apparatus equipped with a spreader having a host of sensors located on the spreader to detect or scan the container for scanned characteristic data related to a container generally during the handling operation of the container by the transport apparatus.

The scanned characteristic data is then communicated from the sensors located on the spreader, on the transport apparatus, or on or inside the container to a local transport computer located on the transport apparatus or the spreader of the transport apparatus where it is evaluated against comparison data regarding that particular container. If after the evaluation of the scanned characteristic data against the comparison data the local transport computer determines that the scanned characteristic data sufficiently matches the comparison data, then the transport apparatus moves the container to its next intended location, within the container handling facility or otherwise, along its route to its final destination. If the scanned characteristic data does not sufficiently match the comparison data, then the transport apparatus moves the container to another location typically within the container handling facility for further inspection. Any number of transport apparatuses having spreaders with sensors located on them may be employed in the present container inspection system.

A local host computer is typically located at each container handling facility and communicates with a local transport computer to download comparison data regarding the containers that a particular transport apparatus may handle. In addition, the local transport computer uploads scanned characteristic data to a local host computer for further processing or further uploading within the present container inspection system.

The scanned characteristic data acquired at the local transport computer by the sensors is uploaded to a local host computer via a radio frequency ("RF") communication link, infrared ("IR") communication link, or wired connection. Transmission of operating power to the equipment in or on the container or spreader, if required, may be accomplished inductively or by wired connection.

A global host computer communicates with all local host computers for uploading the scanned characteristic data acquired by sensors on the spreader of the transport apparatus. The global host computer analyzes all uploaded scanned characteristic data regarding each container inspected to produce three distinct types of characterizations. The first is referred to as a "load model" characterizing a model or type of container and its contents. This "load model" is intended as the reference characterization against which the container inspection system compares any container of that type loaded with contents of that general type. Secondly, the global host computer produces a statistically refined characterization of each unique combination of a container and sealed or secured load of contents as multiple inspections are performed upon that combination in normal handling, referred to as a "load signature". Thirdly, the global host computer produces "weight profiles" derived from various sensory input regarding weight at lifting points, strain at various locations, acceleration, and vibration data collected during the handling of containers and contents. Further, the global host computer downloads these characterizations to those local host computers that may handle a particular container.

FIG. 1 is a pictorial diagram of the architecture of the present container inspection system 100 and one example of container handling facility 102 in which it is implemented. Container handling facility 102 includes transport apparatuses 104 depicted handling containers 108 through the use of spreaders 106. In FIG. 1 three transport apparatuses 104 are depicted, however, any number of transport apparatuses may be employed at a container handling facility 102. Containers 108 are typically brought to or taken from a container handling facility 102 by various modes of transportation 126, such as by air, sea, and land. There is generally some scrutiny of all containers entering and exiting the facility, but only a very limited number incur actual manual inspection or non-invasive inspection of any kind.

Containers 108 means all types of intermodal containers used in world trade commerce, including all types of containers adapted for use by ships, trains, trucks, airplanes, and the like.

Figure 6:
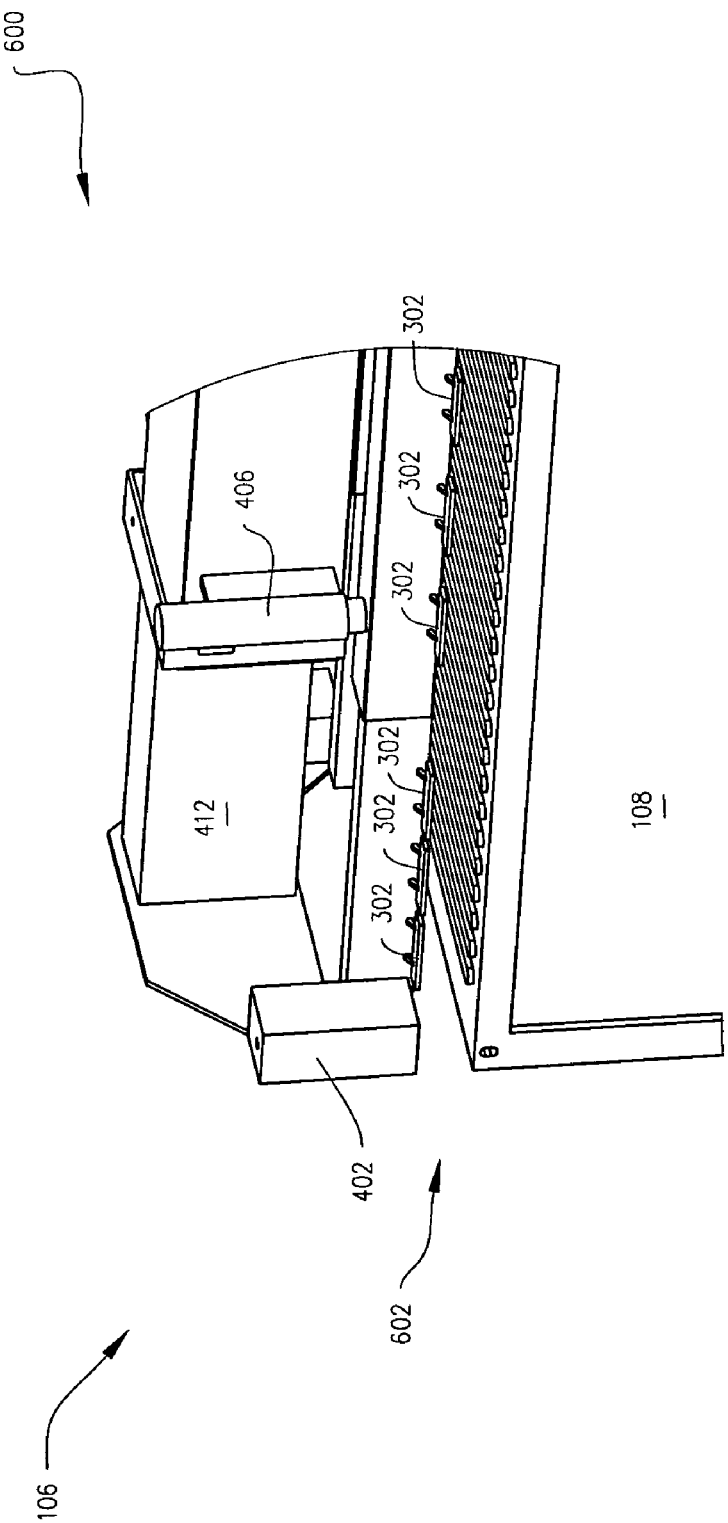
FIG. 6 illustrates a perspective view of a typical container engaged with a typical spreader having an array of sensors in a retracted position relative to the container of the present container inspection system.

Spreaders 106 mean a device which facilitates the capture and lifting of a container by interlocking to International Standards Organization (ISO) standard provisions on the top surface of the container's 108 corner castings 604 (shown in FIG. 6). The lifting action is generally accomplished by providing a vertical lift on all four corners of the container 108, which transfers the weight of the container 108 to the transport apparatus 104, such as a stacker, straddle carrier, or other piece of equipment to which the spreader 106 is fitted. The interface between the container 108 and the spreader 106 conforms, necessarily, to an international (ISO) standard. Lifting of the container 108 by a spreader 106 will necessarily occur several times in the movement of a container 108 from origin/stuffing point to destination/stripping point.

A transport apparatus 104 is a vehicle or device to which a spreader or other framework of similar nature is fitted, that provides the capability to lift, move or transport, and place intermodal freight containers once the spreader or other framework is interlocked with the container. Transport apparatuses 104 include cranes, gantry cranes, straddle cranes, rubber tire gantries, stackers, toploaders, sideloaders, forktrucks, and other types of lifting and moving apparatuses.

While a container is within a handling facility, it is typically handled on multiple occasions and, most often, utilizing such transport apparatus as mentioned above. The transport apparatus is normally fitted with a spreader or similar framework for interfacing to the interlock fittings atop the corner castings of the container. The present system utilizes this standard arrangement for lifting and handling of the container as an opportunity for non-invasive inspection by equipping the spreader or transport apparatus with a variety of sensory and stimulus devices and required processing and communications that are needed to collect, analyze, and communicate such information for further usage, both in determining the likelihood of the presence of unexplained or inappropriate characteristics during the handling and for further enhancement of its own expert knowledge of container characteristics with known contents.

In another embodiment, the system also allows for scanning of sensory devices installed on or inside the container itself.

In one embodiment, the systems on the spreaders 106 or transport apparatuses 104 include local transport computers 202 (shown in FIG. 2) which acquire all sensory data from the various sensors being employed. This data is generally referred to herein as scanned characteristic data, and is produced by the sensors 302 (shown in FIG. 4) and sensors 1102 and 1104 (shown in FIG. 11). Local transport computers 202 communicate with a local host computer 116 via communication links 110 and 114 typically through a network 112. Local host computers 116 typically communicate with the global host computer 124 via communication links 118 and 122 through network 120.

Network 120 is a global network, based upon commercial telecommunications infrastructure, described in more detail below. This global network allows for the communication between the global host computer and local host computers around the world to allow for information to be centralized, processed, and maintained. This network also supports the communication between the container inspection system and those other entities which have a need to obtain or supply information, such as governmental agencies, intermodal freight carriers and consolidators, shippers, consignees, and inventory management systems.

Figure 2:
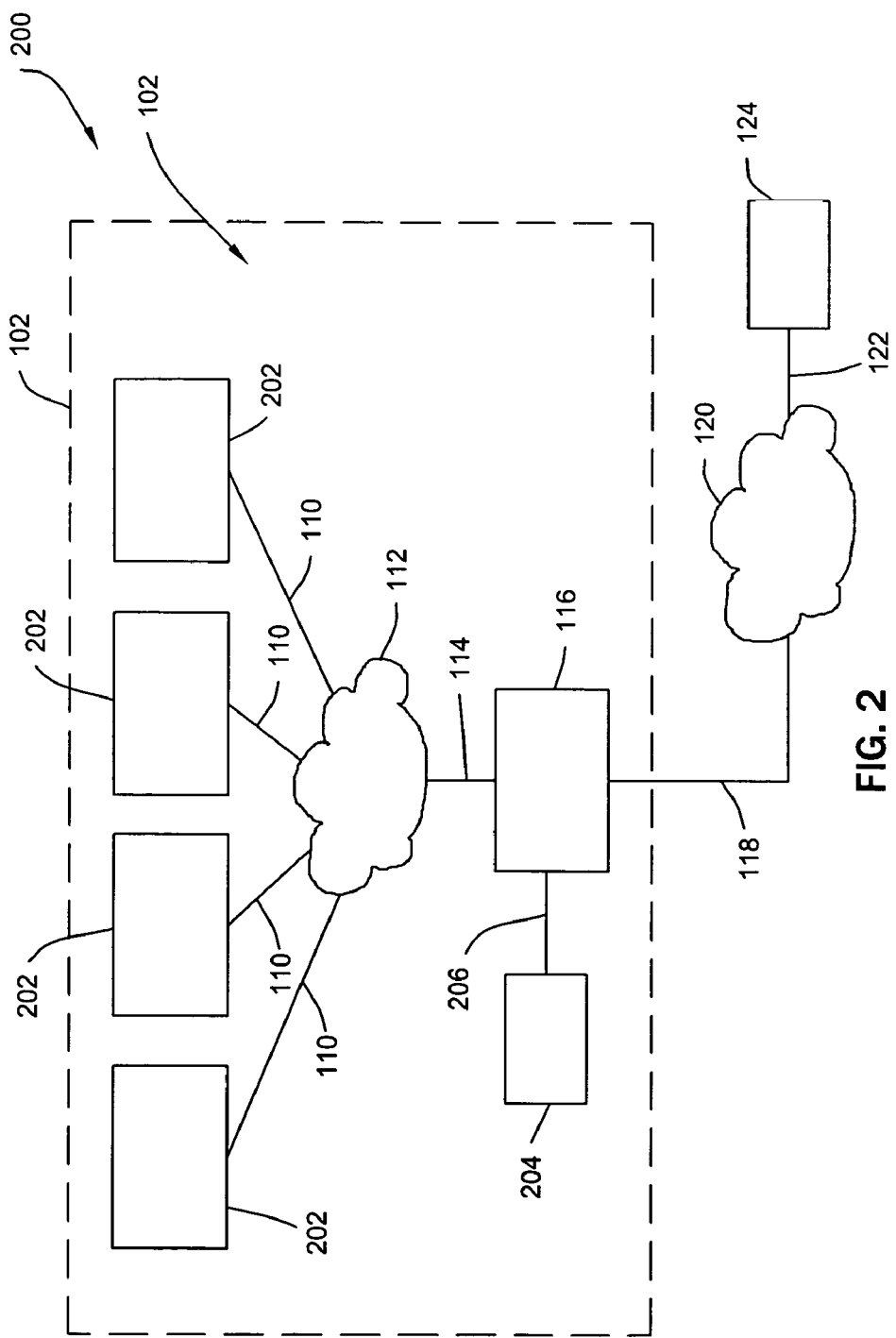
FIG. 2 illustrates in block diagram form the overall architecture of a typical container handling facility including a local host computer in communication with a typical global host computer.

FIG. 2 is a block diagram of an embodiment 200 of the container inspection system 100 as described in FIG. 1 depicting several transport apparatus computers 202 connected to a local host computer 116 through a network 112. Additionally, operator controls, alarms, and indicators 204 can be seen connected to the local host computer 116 via connection 206.

Further depicted in FIG. 2 is global host computer 124 in communication with local host computer 116 via communications links 118 and 122 and network 120. The global host computer 124 will communicate with numerous local host computers 116 throughout the world as well as various other entities as described previously.

In accordance with the present invention, communication links 110, 114, 118, and 122 are preferably secure and reliable communication links. In order for the container inspection system 100 to be compliant with availability requirements of industry and government, such as the Department of Homeland Security's (DHS) stated requirement of 95% Inherent Availability, the communication links 110, 114, 118, and 122 must incorporate a high level of reliability, or assurance that data and control are always received by the intended recipient completely and accurately. Similarly, in the interest of protecting the security of the data and control communications, the communication links 110, 114, 118, and 122 must incorporate a high level of data security encoding or encryption in which to conceal the sensitive information.

For short range communications such as the communications between local transport computers 202 and the local host computer 116, an exemplary solution is according to the IEEE standard 802.11i for Wireless Local Area Network (WLAN). The 802.11 standard introduced in the late 1990's has achieved widespread acceptance, and is therefore advantageous toward the desired interoperability between solutions from different providers. The newly approved 802.11i amendment greatly enhances the security of wireless networks for a high level of assurance that the integrity of networks and data will not be compromised. Preferably, the container inspection system 100 employs Frequency Hopping Spread Spectrum technology in radio frequency transmission in order to avoid interference from nuisance or malicious sources. This feature is also part of the 802.11 specification.

For long range communications, such as between local host computer 116 and the global host computer 124, information will be of a highly sensitive nature, and the communication links 118 and 120 will often be established between the present container inspection system and information systems of governmental agencies, such as U.S. Customs and Border Patrol or the U.S. Coast Guard. Such communications links comply with architectural framework guidelines as defined in the Command, Control, Communications, Computers, Intelligence, Surveillance, Reconnaissance (C4ISR) Architecture Framework Version 2, developed and adopted by the Department of Defense for the purpose of insuring interoperability, integration, and cost effectiveness across organizational and geographical boundaries, particularly with regard to Information Technology. The actual infrastructure for networks 112 and 120 and connectivity between these networks preferably utilize the current commercial telecommunications infrastructure, comprising essentially telephony, cabling, fiber optic, and wireless solutions in great variety. These solutions, chosen for appropriate bandwidth for purpose and operated in a C4ISR compliant grid make up the solution for secure and reliable communications over long range.

Figure 3:
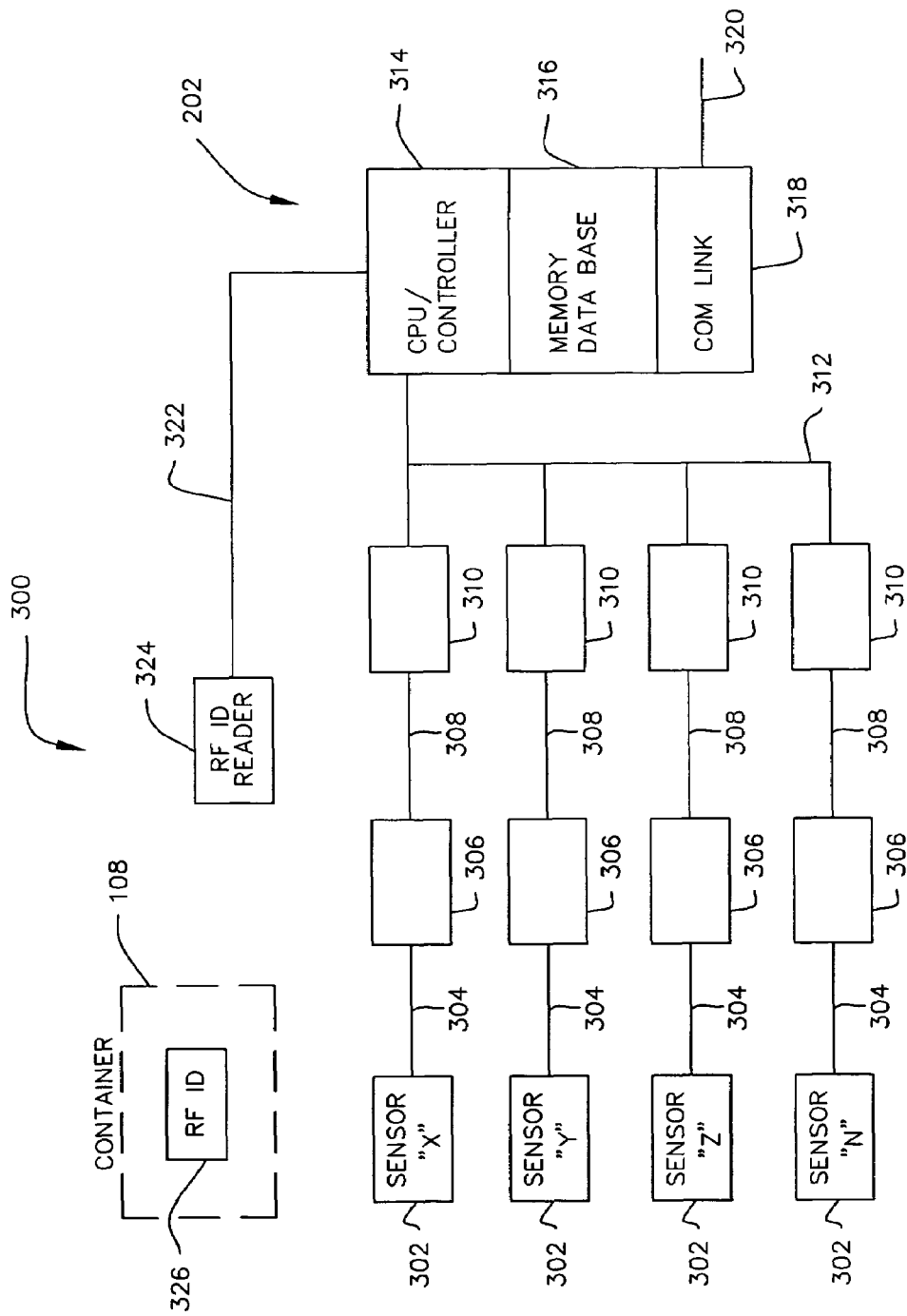
FIG. 3 illustrates in block diagram form the overall architecture of a typical scanning system, including an array of sensors, and a local transport computer in communication with a typical local host computer.

FIG. 3 is a block diagram of an embodiment 300 of exemplary devices that would be utilized on or in the container 108, transport apparatus 104, and spreader 106. A host of sensors 302 (X, Y, Z, and N) are shown connected to signal conditioners 306 via connection 304. Signal conditioners 306 are shown connected to A/D converters 310 via connection 308 and the A/D converters 310 are connected to a local transport computer 202 via an interface 312, which may be wired or non-wired. Typically, the local transport computer 202 further includes a memory 316 and a communications device 318, such as a modem, which communicates to a local host computer 116 via communication link 110.

In one aspect of the present container inspection system, the processor 314 of the local transport computer 202 communicates with a radio frequency identification reader (RFID reader) 324, which reads the identification data from a radio frequency identification tag (RFID tag) 326 typically found on a container.

The global host computer 124 is a computer system that may comprise one or several computing devices operating in concert to provide the functionality of the global host computer 124 described herein. As described above, the global host computer 124 communicates with any number of local host computers 116 to upload and download specific information regarding containers handled by transport apparatuses 104 at a particular container handling facility 102. The global host computer 124 comprises an expert system architecture including a centralized database where it stores scanned characteristic data and where the expert system architecture processes and analyzes these scanned characteristic data to produce "load signatures", "load models", and "weight profiles" from scanned characteristic data uploaded to the global host computer 124 from sensors 106, local transport computers 202, and local host computers 116. The global host computer 124 further downloads these load signatures and load models online to all or some of the local host computers 116 which in turn download these load models and load signatures to the local transport computers 202. The global host computer's 124 expert system architecture has its own artificial intelligence to develop and refine these load models and load signatures for use in container inspection by the constituents of the present system throughout the world.

Uploading data generally means the transfer of data or code from one of a number of disperse computers to a centralized computer or server with which it communicates. For example, the local transport computers 202 upload scanned characteristic data produced by the sensors 302 to a local host computer 116. Downloading data generally means the transfer of data or code from a centralized computer to one of a number of disperse computers with which it communicates. For example, the local host computer 116 downloads load models to the local transport computer 202 to be compared against scanned characteristic data provided by the sensors 302.

Global host computer offline processes generally mean a process in computing that is not part of the primary or time sensitive function of a network of computers and may be physically disconnected from the network.

The global host computer's 124 expert system architecture generally means a computer program or instructions that apply artificial intelligence methods to the task of problem-solving by using detailed knowledge and attempting to simulate the reasoning process of an expert. The global host computer 124 will contain at least one load model and at least one load signature developed from previous scans of a specific container with a specific content or load from the time that it was first loaded and scanned until the time when its contents have changed.

Load signature means generally those one or more sets of scanned characteristic data that is produced by the global host computer 124 scanning a particular serial number of container with a specific load. When the same container 108 and same load or contents is then scanned again at the same container handling facility or at another container handling facility by another transport apparatus 104 and spreader 106, this scanned characteristic data is then uploaded to the global host computer 124 where it is stored and analyzed and the load signature corresponding to that particular container is further refined, by averaging or other mathematical or statistical methods.

Generally, scanned characteristic data means that data that is produced from the sensors 302 during an inspection of a container 108 by the spreader 106 of a transport apparatus 104 during or substantially during the handling of the container 108 by the transport apparatus 104. This scanned characteristic data is then communicated to the local transport computer 202, which uploads the scanned characteristic data to the local host computer 116, which in turn uploads the scanned characteristic data to the global host computer 124.

The local host computers 116 at various container handling facilities 102 upload scanned characteristic data produced by various sensors 302 to the global host computer 124. Typically, the global host computer 124 downloads the identification (ID) and bill of lading (BOL) and comparison data for each container 108 at or before the time a particular scan is performed. It uses these collected scans to produce and refine the load signature for what a particular container 108 having a specific container ID and specific load of contents should look like to the sensors 302 and the local transport computer 202. It then downloads that load signature to the local host computer 116. This load signature, as described above, is specific to a particular container having a particular ID loaded with a particular contents.

Load models are characteristic of a model of container loaded with a certain type of contents and contain information describing what the sensors 302 during their normal inspection should see, with a container like that and contents like that. Scanned characteristic data from many scans of similar containers and similar contents is used to develop a load model regarding a certain model of a container 108. Scans of empty containers 108 are part of the information that makes up a load model. Load models are collections of data characterizing a particular combination of container type or model and specific contents in terms of the sensory response to be expected to a sensor scan of the container 108 and those contents under specific conditions.

A local host computer 116 is located near or within a container handling facility 102 and communicates with or serves the needs of all local transport computers 202 in that container handling facility. A local host computer 116 further communicates with local entities, such as law enforcement, customs and border protection, shippers and consignees, and container handling facility operations entities to collect various required or useful information regarding those containers 108 handled by a particular container handling facility 102.

Figure 4:
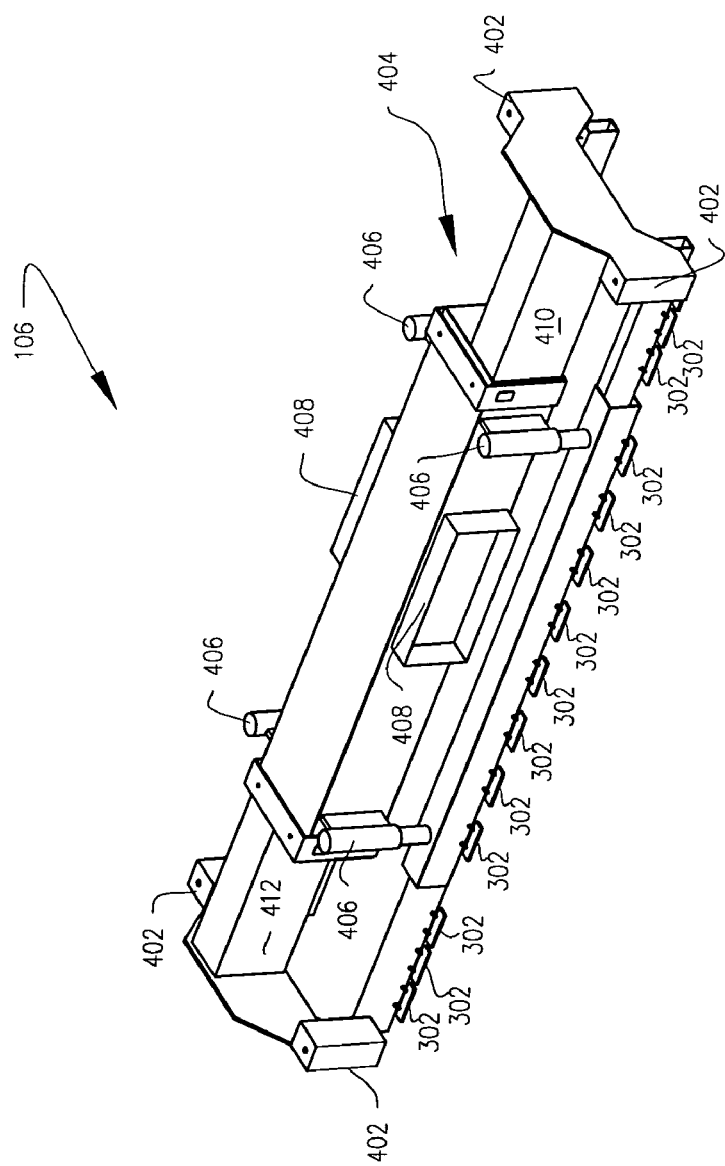
FIG. 4 illustrates a perspective view of a typical spreader of the present container inspection system.

FIG. 4 illustrates an embodiment 400 of a typical spreader 106 of the present container inspection system 100. The spreader 106 includes lifting fittings 402 for connecting with a container's 108 corner castings 604. Typically, there is a lifting fitting 402 at each corner of the spreader 106. In this embodiment 400, the lifting fittings 402 are partially incorporated and supported by end members 422, which are connected to spreader trusses 410 and 412. In this embodiment 400, spreader trusses 410 and 412 are arranged such that they are offset and adjacent to one another thereby providing a semi-telescoping arrangement for each to slide past the other. This arrangement allows spreader 106 to adjust its size to fit containers 108 having varying sizes. Spreader 106 further includes a main housing 418 that provides guidance support for spreader trusses 410 and 412 and houses the local transport computer 202 at local transport computer housing 408. A local transport computer 202 may occupy either or both sides of the local transport computer housing 408 as shown.

A feature of the spreader 106 as shown in embodiment 400 are the vertical adjusters 406 located between the spreader main housing 418 and the sensor array main housing 416. The vertical adjusters 406 may be any of a number of types, such as hydraulic or pneumatic cylinders, ball screws, motor driven rack and pinion, or linear actuators. The vertical adjusters 406 operate to lower and raise the sensor array main housing 416 and sensor array trusses 414 and 420 thereby moving the sensors 302 located thereon into and out of scanning position relative to the container 108. The system utilizes knowledge of the design of the container currently being handled to accurately position the sensors with respect to the tops of the corner castings. When handling of the container and scanning of its characteristics is completed, the sensor main housing 416 and sensor trusses 414 and 420 are retracted vertically to move them out of harms way while the spreader 106 is moved to engage with the next container 108.

A plurality of sensors 302 are depicted connected to the sensor array main housing 416 and sensor array trusses 414 and 420 that are connected to the end members 422 of the spreader 106. This connection is via a linear bearing arrangement, such that the position of the trusses with respect to the spreader end members 422 and therefore with respect to the corner castings of the container 604 is maintained while allowing for vertical adjustment of the trusses 414 and 420 along with the sensor array main housing 416. In this embodiment, sensor array trusses 414 and 420 also have a semi-telescoping arrangement that provides for adjustment of the spreader 106 size without affecting the sensors 302 ability to scan a container 108.

Communication link 110 is shown as a radio frequency antenna protruding from the local transport computer housing 408. While the facility sometimes exists for wired communications from larger transport apparatuses 104, the variety of such and the requirement for mobility makes wireless communications the preferred embodiment for such short range communications, as described in association with FIG. 2.

Figure 5:
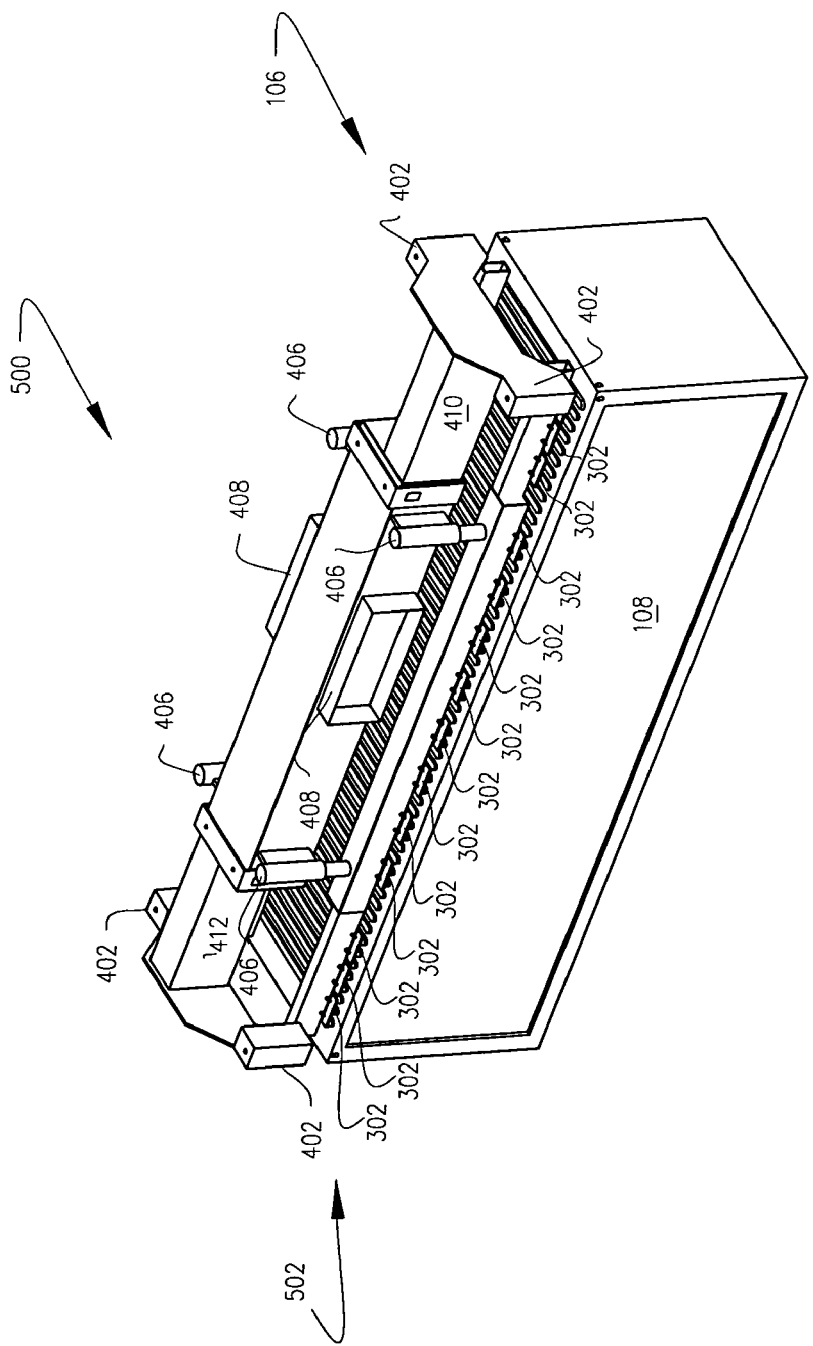
FIG. 5 illustrates a perspective view of a typical container engaged with a typical spreader having an array of sensors in a deployed position relative to the container of the present container inspection system.

FIG. 5 illustrates an embodiment 500 of a spreader 106 engaged with a container 108 with the sensors 302 in a deployed position relative to the container 108.

FIG. 6 illustrates an embodiment 600 of a spreader 106 not quite engaged with a container 108 depicting the sensors 302 in a retracted position relative to the container 108. This embodiment depicts an XYZ coordinate system 602 whose origin is located at the center of the opening at the top of corner of the container corner casting 604. The nature of the corner casting 604 and the openings for interlocking with them is controlled by ISO standards. The system utilizes the known compliance with the ISO standard along with specifications for the manufacture of a particular model of container to establish the location and nature of secondary interface points along the container 108 surface, and to accurately locate them in the X, Y, and Z axes of the XYZ coordinate system 602. The location on a spreader 106 for an invasive probe 804 and the location on a container 108 for a corresponding portal 802 (both shown in FIGS. 8-10), as described below, will be defined within this coordinate system for installation and for utilization relative to the location of the interlock points, in accordance with ISO standards and the container 108 specifications. This facilitates ease of installation and reliability of insertion of invasive probe 804 into the portal 802. Location of stimulus application point, as described below, where stimulus is imparted into or through the container wall and is also defined for a given container 108 within the XYZ coordinate plane relative to the location of the interlock points of the corner castings 604. This will facilitate repeatability of signal injection over multiple inspections of the given container 108. Further, location of the response measurement array of sensors 302, as described below, for the measurement of various modalities is defined relative to the location of the interlock points for a given container. This will facilitate repeatability of signal injection over multiple inspections of the given container. It is acknowledged that the container 108 specifications will vary, and that preferred location for imparting stimulus, for positioning of sensors 302 on the surfaces, and for installation of the portal 802 will vary as a result. The embodiment described is only exemplary, and other means may be required for position of elements of the system.

Sensors 302 mean generally a device that measures or detects some physical condition such as motion, light, or other physical condition. In one aspect 15, of the present container inspection system 100, sensors 302 are located on the spreader 106 of a transport apparatus 104 and in another aspect, sensors 1102 are located on the inside of the container 108 (See FIG. 11).

Many different sensors 302 are contemplated for use with the present container inspection system 100. In one aspect of the sensors 302 employed in the present container inspection system 100 is a sensor 302 that receives information from an electronic tamper-indicating seal designed to leave non-erasable, unambiguous evidence of unauthorized access or entry. These seals are commonly known in the art, such as the Savi 602 produced by Savi Technology, which employs RFID technology to communicate via radio waves the condition of the electronic seal to a nearby RFID reader, such as one that is part of a scanning system as shown in embodiment 300 of FIG. 3.

In another aspect of the present container inspection system 100, radio frequency identification tags (RFID) and sensors are used for container 108 identification and retrieval of container attributes, such as damage and repair history, condition of walls, condition of finish, or modifications that would not otherwise be known from manufacturer's specifications. In addition to these container attributes, others will be provided upon identification by the RFID tags/sensors, such as size, empty weight, and other manufacturer specification from the global host computer, where the consolidated global database is maintained.

In another aspect of the present container inspection system 100, weight or load sensors are used in conjunction with the lifting fittings 402 on the spreader 106. These load cells determine the load or weight where the lifting fittings 402 connect with the corner castings 604 on a container 108. Through hole load cells are manufactured of heat treated 17-4 ph Stainless Steel and are protected against most industrial environments. Strain gauges and/or load cells can be located on the twist lock heads. Load cells can be located on lifting fittings 402 and/or the casting corners 604 or strain gauges can be located on both sides of the spreader 106. In another aspect of the present container inspection system 100, load cells or sensors can be placed on the spreader trusses 410 and 412. These cells offer weight measurement ranges over 80,000 lbs with sensitivity of 0.1%. Exemplary load sensors can be obtained from AmCells Corporation or Transducer Techniques Inc.

In addition, the present container inspection system 100 contemplates using internal sensors 1102 (Shown in FIG. 11) that measure radiation emitted by the contents of a container 108. As with the other sensors described herein, radiation measurements by these sensors 1102 will be made along with other measurements to improve the comprehensiveness of the scanned characteristic data of the containers 108. There are numerous sensors on the market that can easily be interfaced to a computer-controlled system that will detect radiation emissions. Geiger counters are exemplary instruments for detecting alpha, beta, gamma, and x-rays. These utilize the Geiger-Muller tube as the detection device. Newer technology utilizing smaller, less expensive Cadmium Zinc Telluride (CZT) detectors is now available from several sources, such as the RFTrAX RAD sensor from RFTrax, Inc., and the GR-135 from Scientific Applications International Corporation (SAIC).

Furthermore, sensors 1102 that measure biological activity are employed in the present container inspection system 100. These sensors 1102 are also mounted internally and will detect the presence of certain biological contents in the containers 108. An exemplary sensor capable of biological agent detection is the Bio-seeq technology detector by Smiths Detection, which uses Polymerase Chain Reaction (PCR) Technology.

Further yet, sensors 1102 involving measuring neutron emissions from the contents of a container 108 can be installed within the container. Neutron sensors are important in that the presence of neutrons indicates the presence of spontaneously fissioning isotopes such as plutonium and californium or induced fissions such as occur in uranium. These sensors 1102 are currently being developed and are available to companies developing security systems. Exemplary sensors regarding neutron emission can be found at the Y-12 National Security Complex, or Dept. of Energy.

FIG. 7 illustrates an embodiment 700 of a spreader 106 engaged with a container 108 depicting a portal and invasive probe assembly 702 according to the present container inspection system 100. In one aspect of the present container inspection system 100, one portal/invasive probe assembly 702 is used. In another aspect, two portal/invasive probe assemblies 702 are used.

FIG. 8 illustrates a portal 802 and an invasive probe 804. The portal/invasive probe assembly 702 is comprised of these two main subassemblies. The invasive probe assembly 804 is mounted onto the spreader 106. Preferably, the portal 802 is permanently attached to the container 108. The mounting location of the portal 802 onto the container 108 and the position of the invasive probe assembly 802 upon the spreader are relative to the center of the interlock atop the corner casting 604, and are defined accurately in the XYZ coordinate system 602.

Figure 10:
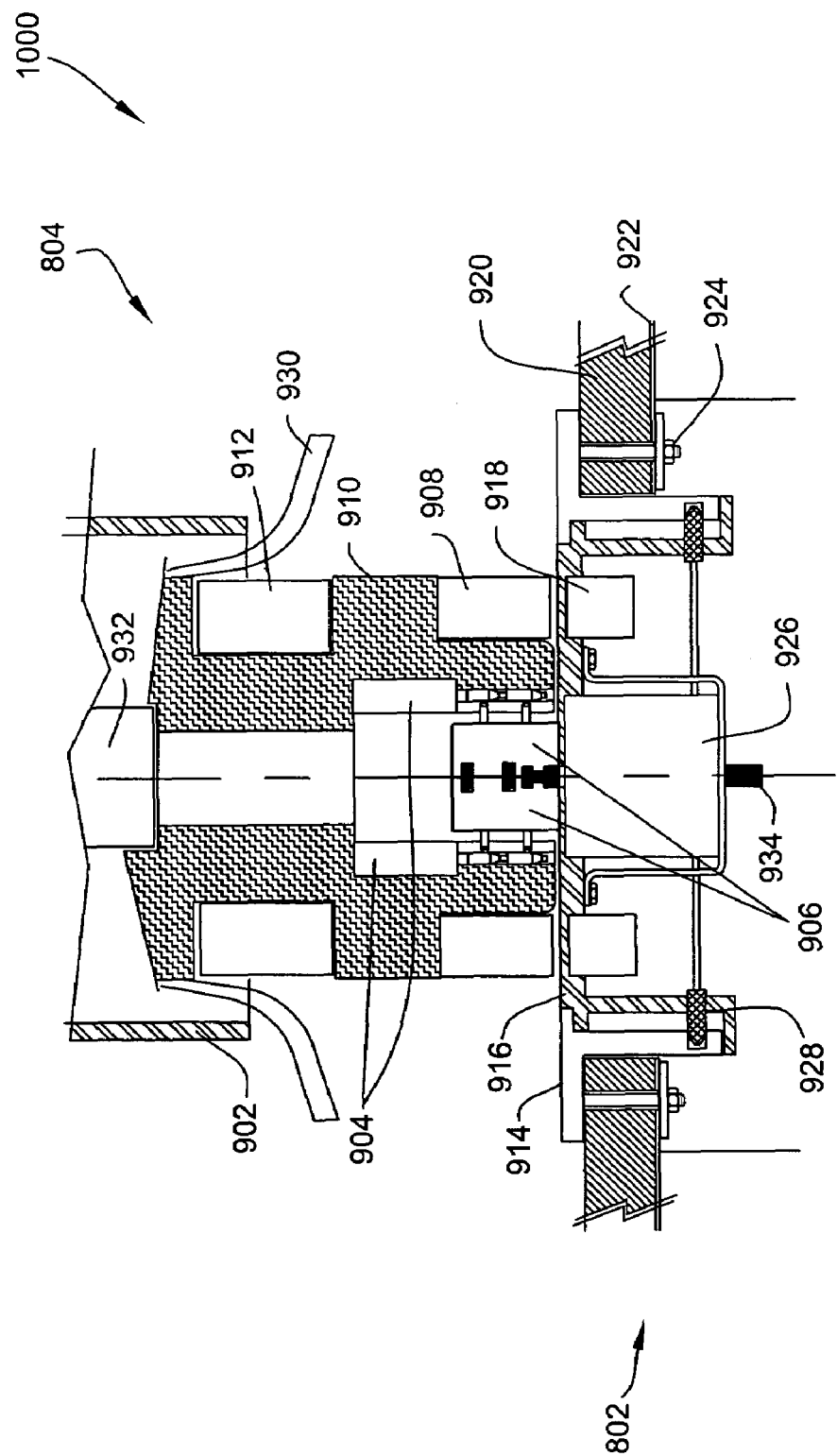
FIG. 10 illustrates a cross-section view of an invasive sensor engaged with a portal of the present container inspection system.

FIGS. 9 and 10 illustrate an embodiment 900 of a portal 802 and an invasive probe 804 while not engaged and an embodiment 1000 of a portal 802 and an invasive probe 804 while engaged, according to the present container inspection system 100. The invasive probe 804 is comprised of a probe housing 902, probe body 910, solenoids 904, plunger 934, detection sensors 912, clamping jaws 906, inductance transformer ring 908, protective boot 930, and extension/retraction mechanism 932 located inside the housing 902.

The portal 802 is comprised of the housing ring bezel 914, solenoid 926, locking mechanism 928, sealing material 920, inductance transformer ring 918, portal interface plate 916, and mounting hardware 924. In one aspect, the probe body 910 is in the retracted position. Once a container 108 has been secured by the spreader 106 the local transport computer 202 will control the sequence of events for gaining probe entry into the container 108. Extension of the probe body 910 is activated until the probe body 910 contacts the portal interface plate 916. Upon detection of complete travel required the power is supplied to the inductance transformer ring 908 and power is transferred via the inductance transformer ring 918 of the portal 802 to the solenoid 926 inside the portal 802. By activating the solenoid 926 the plunger 934 is extended upward. The timing sequence then activates the solenoids 904 which mechanically grab the plunger 934. Once secure, the locking mechanism 928 is activated unlocking the portal interface plate 916 from the housing ring bezel 914. After unlocking, the probe body 910 is extended into the container 108, displacing the portal interface plate 916 and all parts assembled to it into the interior of the container. The portal interface plate 916 is designed to be captive, in the sense that its diameter is greater than the inside diameter of the housing ring bezel 914, and cannot therefore be displaced to the outside of the container 108 walls. The detection sensors 912 located on the probe body 910 are then placed in the acquisition mode until acquisition of scanned characteristic data is complete or time expires.

The invasive probe 804 is then retracted a finite distance allowing the locking mechanism 928 to re-engage into the housing ring bezel 914. Power is then removed from the solenoids 904 to release the plunger 934. Power is then removed from the inductance transformer ring 908 which allows the plunger 934 to return to its retracted position. The probe body 910 is then retracted back into the default position within the probe outer housing 902.

The invasive probe samples the air or environment of the inside of the container 108 during handling of the container 108 by the spreader 106.

A second functionality of the invasive probe 804 is that of providing a stimulus for certain sensory devices internal to the container, such as biological, chemical sensors, or radiation sensors. For example, through the injection of very small volumes, of a low vapor pressure element such as certain hydrocarbons, chemical sensors intentionally positioned very near to the injection point are tested for operability and to an extent calibration. The effect of such small volumes is short lived, due to the rapid dispersion in air, and does not permeate contents or surfaces due to high atomic weight, such that it not interfere with subsequent sampling for unexplained presence of similar chemicals.

Similarly, radiation and neutron detection sensors are tested for operation and calibration through the exposure to radioactive material affixed to the sensor probe inserted into the container in close proximity to such sensors.

Figure 11:
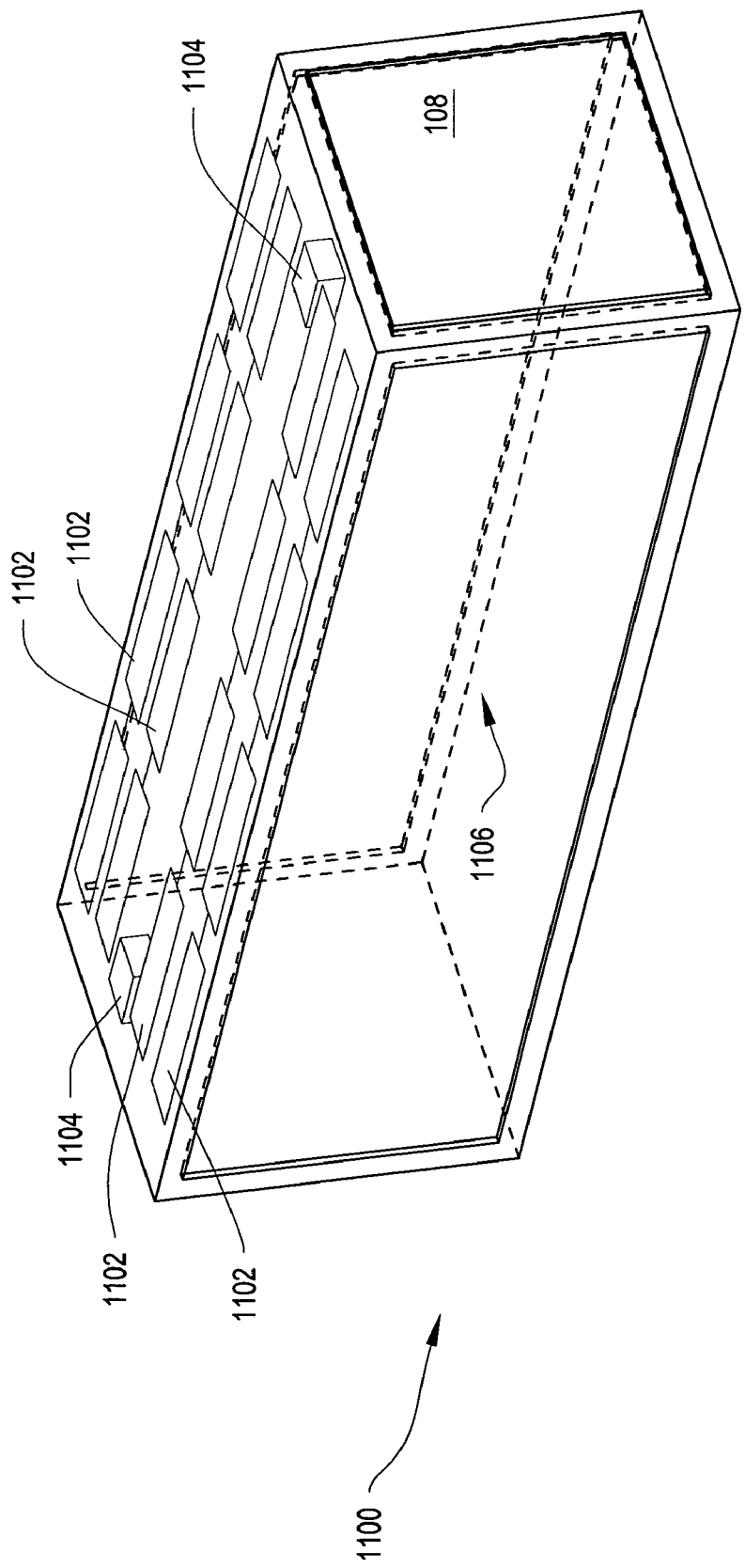
FIG. 11 illustrates a perspective view of a container depicting sensors located inside the container of the present container inspection system.

FIG. 11 illustrates an embodiment 1100 of a container 108 having sensors in an array 1102 and various individual sensors 1104 located inside the container 108 according to present container inspection system 100.

Certain physical characteristics of a container 108 contents cannot readily be measured from outside the container walls and within the short period of time during which the container is suspended from a transport apparatus 104. For these characteristics, sensors 1102 must be inside 1106 the container 108, either as permanently installed additions to the container 108 interior, or through temporarily inserting one or more invasive probes 804 into the container 108 such as in embodiment 702 of FIG. 7.

Physical characteristics requiring sensors 1102 inside the container include biological agent and chemical detection sensors 1102. These require not only access to the interior 1106 of a container 108 and the air or vapor contained within, but also substantial periods of time over which to obtain a quantifiable sample.

Infrared temperature and imaging measurement is preferably performed inside 1106 the container 108 as the infrared radiation given off by heated surfaces generally will not penetrate the container walls. Also preferably, acoustic waves within the container walls is best measured internally, as the container walls largely reflect, attenuate, and distort these waves.

Acoustic sounding has long been used in various fields for the purpose of producing an image of something that is otherwise not visible. Examples would include the fields of medicine, oil and gas exploration, structural engineering, geological surveying, and archeology. In these applications, sonic or ultrasonic acoustic waves are radiated by some source into or through some medium and the resulting patterns of reflected, refracted, or transmitted wave fronts are collected and processed into an image of the medium. The image will primarily indicate the location of and the degree of changes in density, which cause reflections as well as refractions of energy and changes in propagation velocity. Acoustic source signaling may be either impulsive or of a swept frequency nature. In acoustic imaging, it is the amplitude and the timing of the measured reflected and refracted waves that is of primary interest.

The resolution of the image is largely a function of the number and spacing of source/receiver combinations together with the wavelength of the acoustic energy signal employed. With sufficient combinations of source and receiver location, a three dimensional image is obtained.

Swept Frequency Acoustic Interferometry (SFAI) is a relatively new technology, although it has found application in medical diagnosis, fluid container inspection, and pipeline inspection and flow monitoring. In SFAI, acoustic energy is also radiated into or through a medium and resulting patterns of reflected, refracted, and transmitted waves are collected and processed, but the objective and methodology are somewhat different from acoustic imaging.

SFAI employs swept frequency signaling of acoustic energy to determine the resonances existing within an enclosed space. A given container will exhibit a spectrum or signature of resonances when empty, based upon its physical characteristics, particularly its dimensions and the materials from which it is constructed. When the same container is loaded with various contents, the dimensions, density, and location of those contents will result in a very different and much more complex, and therefore unique, spectrum of resonances. With SFAI methodology, it is the resonances observed in the response of the medium under inspection that are of primary interest.

As with acoustic imaging, the resolution of the image is largely a function of the number and spacing of source/receiver combinations together with the wavelength of the acoustic energy signal employed.

While the principals are similar to those of other applications, the solutions for acoustic source and receiver must be specific to the present application.

The typical intermodal freight container is in itself a highly reverberative chamber, generally constructed of corrugated steel walls and having a wooden floor mounted to a very rigid framework. Acoustic energy will not propagate well through the walls or ceiling of the container, and those are the most accessible surfaces during typical handling. Acoustic waves incident upon the outer surface of a wall of the container will be largely reflected and what penetrates to the interior of the container will be highly distorted and dispersed through the response of the wall mechanical system. Similarly, acoustic signal of interest within the container walls will not propagate well through the walls and into the air outside the container.

For the acoustic receivers, the preferred embodiment is to equip the container interior with an array of acoustic receivers sufficient in number and spatial density to provide a suitable degree of resolution. The preferred solution for its cost/performance advantage for large volume, small size, and low power consumption is the Micro-Electro-Mechanical Systems (MEMS) based condenser microphone, such as the SiSonic line from Knowles Acoustics. Arrays of such receivers permanently installed in linear patterns along the longitudinal axis of the container provide for high spatial density in the plane above the cargo, in a manner similar to the exemplary depiction of sensors 1102 of FIG. 11. Power, pre-amplification, and interconnection wiring is accomplished through low cost surface mount circuit assemblies encased in low cost protective molded enclosures of low profile so as to provide for protection for the receivers during loading and unloading of contents.

In another embodiment, the acoustic receivers are low cost MEMS accelerometers installed on the inside or outside surface or surfaces of the container in a similar pattern but adjusted to allow for position for optimal sensitivity based upon the container wall mechanical response. While this embodiment presents a greater challenge in the extraction of acoustic signal, it also provides a great deal of additional information regarding the mechanical behavior of the container with its current contents.

Alternatives to acoustic wave sources outside the container include acoustic radiators inside the container, mechanical actuators on the surface of the container to produce acoustic emission from the container wall, and the use of the container wall as a radiator through non-contact energy transmission.

While acoustic radiators inside the container would yield the optimal results for acoustic wave generation, their size and power requirements are not suited for this application. The preferred embodiment is to use mechanical actuation of the container wall, through the use of one or more tactile transducers, such as the model TST429 from Clark Synthesis. The transducer is brought into proximity to the container wall, and then held in mechanical contact by the magnetic field generated by an associated electromagnet. Multiple transducers in different locations induce acoustic waves either in sequence or through simultaneous orthogonal swept frequency signaling for more expeditious data acquisition with multiple source locations.

In another embodiment, the container wall is caused to emit acoustic signal through use of a non-contact source of energy, such as the HyperSonic Sound (HSS) from American Technology Corporation™. The HSS projects a highly directional beam of modulated ultrasonic audio frequencies into the air that cannot be heard from outside the beam. When this beam is directed at the container wall or ceiling, the discontinuity in acoustic impedance produces mixing of the ultrasonic frequencies into audible frequencies radiated from the surface of the container wall at the point of incidence. The HSS can therefore be mounted to container handling equipment out of harms way and produce the internal acoustic signaling required without coming into contact with the container wall. Multiple HSS units are be used to produce simultaneous orthogonal sweeps of acoustic signal at multiple locations on the container surface to achieve the desired density of source and receiver combinations.

In one embodiment, the container inspection system 100 utilizes internally positioned sensors 1102, fitted to the interior 1106 ceiling and/or walls of the container with necessary sensor interfacing, signal conditioning, data acquisition, and storage capability. The devices consume low power intermittently from internal power storage, and communicate via radio waves with each other and with servers or data collectors outside the container. Such devices are disclosed in U.S. patent application Ser. No. 10/412,074 (Pub. No.: US 2004/0041706 A1 dated Mar. 4, 2004) and 10/600,738 (Pub. No.: US 2004/0073808 A1), which are incorporated herein by reference. The present container inspection system 100 accepts such information through communications either directly with the smart sensor technology inside the container 108 or through communications with servers or data collectors, which have communicated with the smart sensors and acquired the sensory data from them. Such data is utilized along with sensory data collected by the system during handling in analyzing the physical characteristics of the container 108 against the stated contents.

Power for such internal smart sensors is provided by internal storage, with necessarily limited storage capacity due to volumetric constraints. Smart sensors will generally provide for power conservative operation, wherein the majority of the time the power consumed is negligible, and power is only consumed in significant amounts during intermittent operation to obtain and store periodic sensory data samples for later extraction.

The present container inspection system 100 provides for recharging the power storage to capacity during the handling of the container through such inductive charging systems as are known to one skilled in the art and previously disclosed such as in U.S. Pat. Nos. 5,959,433 and 5,903,134. Power is introduced both for the purpose of recharging of the storage capacity as well as for the operation of sensors 1102 consuming higher power during the handling of the container 108, such as acoustic radiators internal to the container 108. A primary magnetic core and winding affixed to the transport apparatus 104 is brought into proximity with a secondary magnetic core and winding incorporated into the ceiling interior of the container and power is coupled into the container 108 through their common magnetic field. An exemplary arrangement of such inductive coupling windings is that of inductance transformer rings 908 and 918 of embodiment 900 in FIG. 9.

Additionally, sensors 1102 suitable for permanent installation into containers 108 are under development or already exist today. One such system was developed by RAE Systems, in partnership with Ember Corporation who provided the communications and networking solutions. The RAEWatch modules are small, battery powered units that mount to the interior walls of a container 108. Each sensor 1102 is equipped with 2.4 Ghz radio communications and advanced networking software, providing the capability for a self-organizing, self-healing networking and ensuring fault tolerance.

The sensor systems are portable, compact, power efficient, and rugged. Cesium iodide and lithium iodide scintillator technology provides low-level radiation detection with very high sensitivity. Photo-ionization detection technology yields very high sensitivity in detecting a broad spectrum of chemical agents. An advanced non-dispersive infrared (NDIR) sensor provides compact and highly sensitive carbon dioxide detection, while low-power motion, vibration, tilt, and Hall effect sensors 1102 provide for physical container 108 security.

The wireless communications from Ember Corporation provide high power efficiency in an IEEE 802.15.4 compatible physical layer system. Support for Automated Encryption System (AES-128) provides the basis for secure communications and node authentication. A resource-efficient network stack supports a mesh network architecture that is self organizing and self extending. Schedule communications authenticated with AES-128 ensure that node tampering or counterfeiting is easily detected.

The sensor nodes communicate either with each other in a self extending network or with an external gateway device outside the container, such as attached to handling equipment or a nearby terminal. Alerts are either reported real time when communications with a gateway are available or reports are stored for later extraction.

Figure 12:
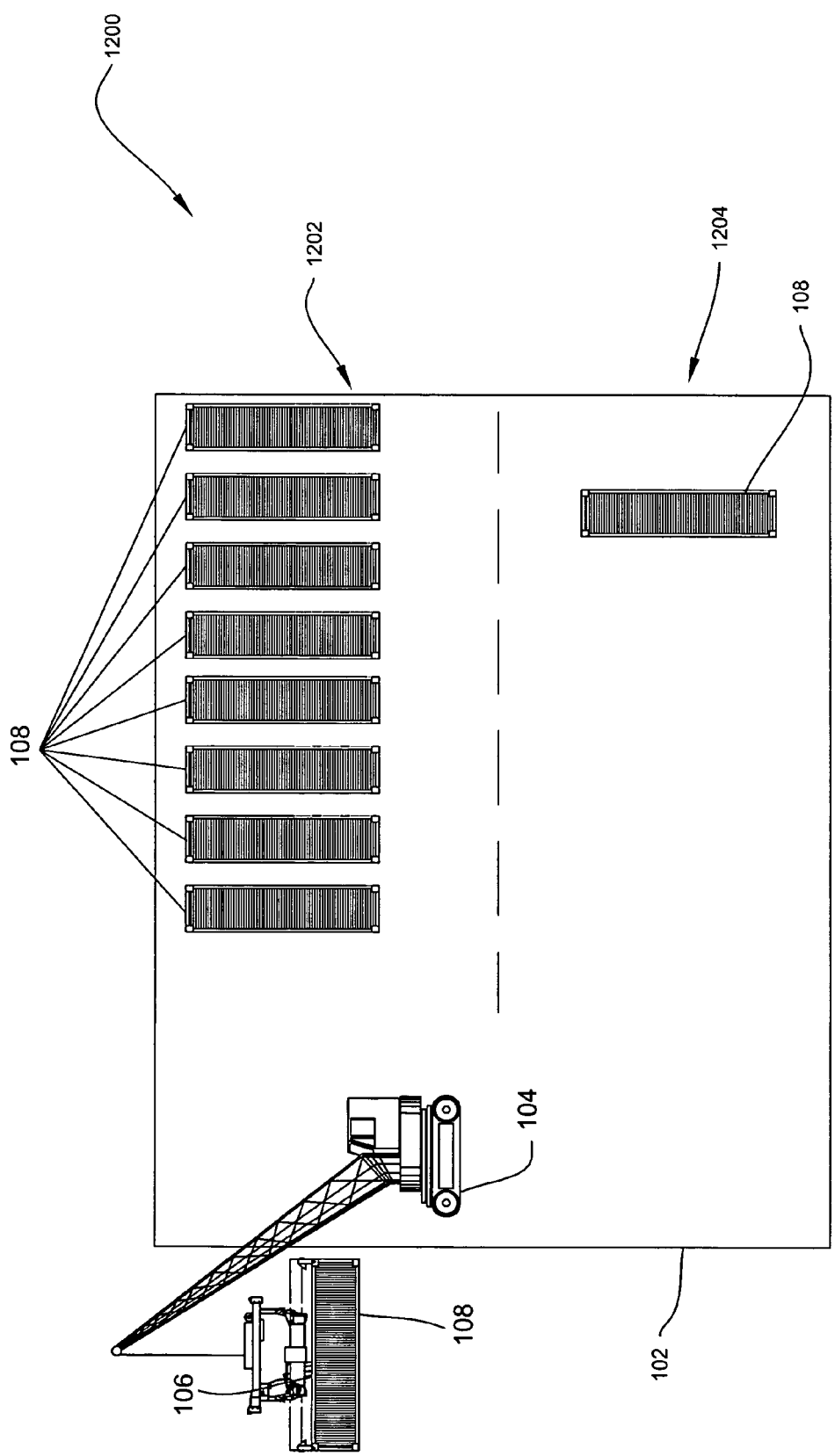
FIG. 12 illustrates a container handling facility having a location for placing containers that pass inspection and a location for containers that don't pass inspection of the present container inspection system.

FIG. 12 illustrates a container handling facility 102 having two areas 1202 and 1204 for placement of containers after the container inspection system 100 has determined whether a particular container 108 passes inspection and is forwarded along its route or whether the particular container 108 is set aside for further inspection. In one aspect, the local transport computer 202 of the transport apparatus 104 determines that after inspection of a container the scanned characteristic data sufficiently matches the comparison data, then the transport apparatus 104 moves the container 108 to a container pass area 1202. In another aspect, if the scanned characteristic data does not sufficiently match the comparison data, then the transport apparatus 104 moves the container 108 to a container fail area 1204.

Figure 13:
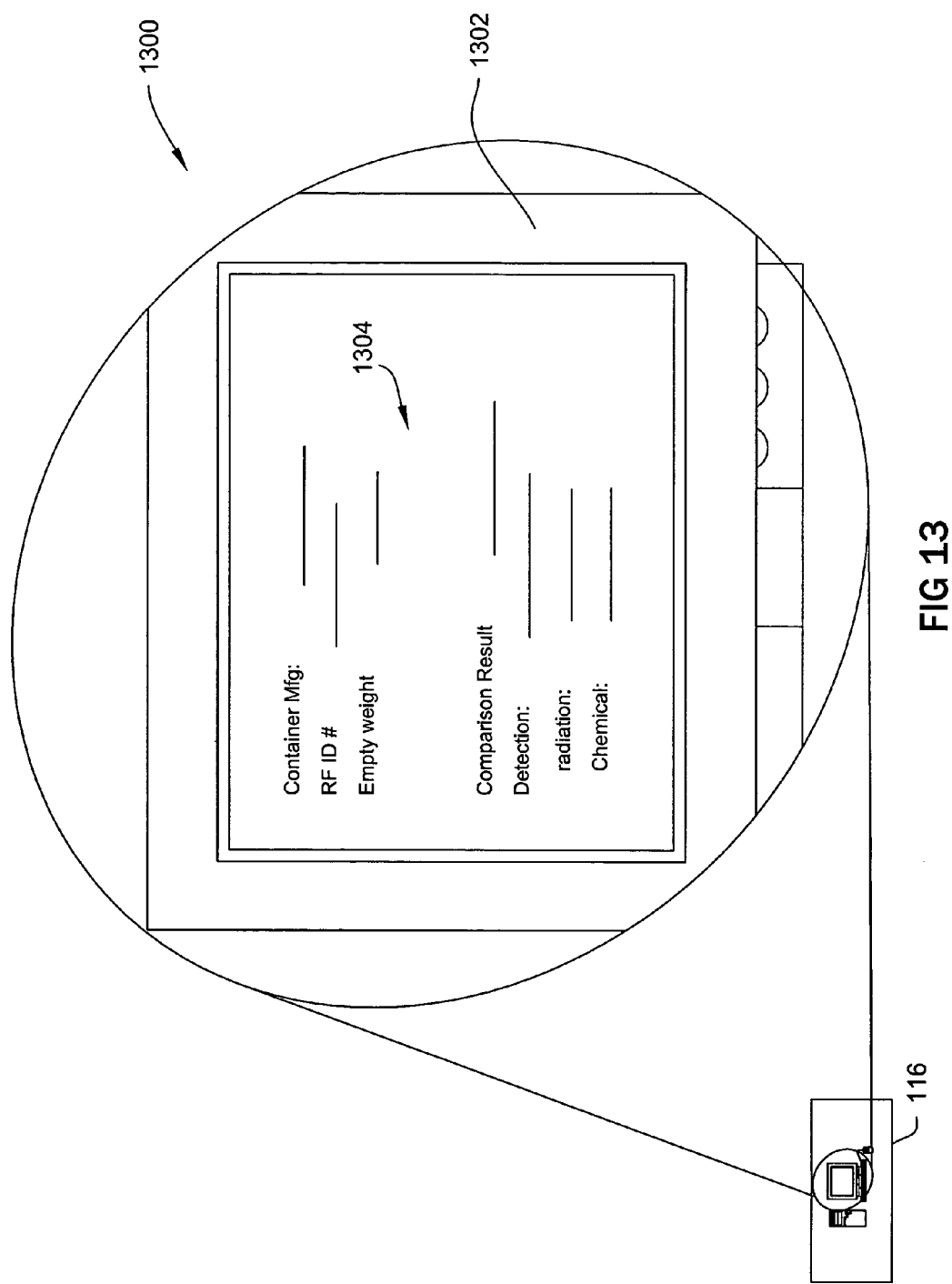
FIG. 13 illustrates a screen shot of a workstation of a typical local host computer or global host computer depicting data related to a container.

FIG. 13 illustrates an embodiment 1300 of a display 1302 of a local host computer 124 depicting a typical simplified user interface display 1304. As containers 108 are inspected during normal handling procedures, the operator or user of the container inspection system is presented with simplified results information for each container inspected by any of the local transport computers 202 in the handling facility. Only when an anomalous condition is detected is the user or operator presented with more detailed information, such as in the examples of FIGS. 18 through 21.

Figure 14:
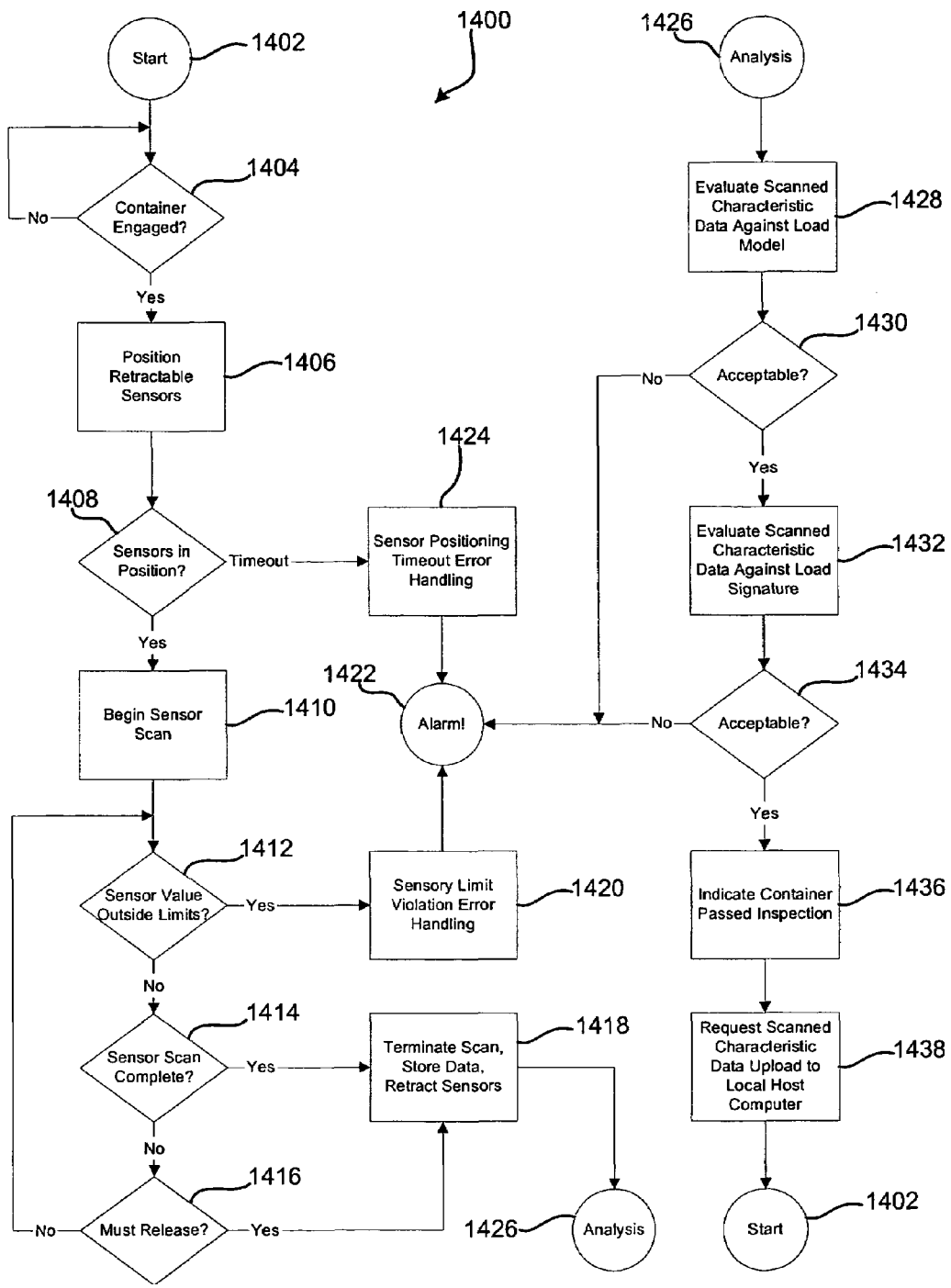
FIG. 14 illustrates in block flow diagram form a typical inspection process performed on a container by a typical scanning means associated with the handling of a container as an example of the operation of the present container inspection system.

FIG. 14 illustrates in block flow diagram form an embodiment 1400 of a typical inspection process.

At the starting point 1402 of this flow, it is understood that information has already been downloaded to the local transport computer 202 from the local host 116. That information includes all required comparison data for some number of containers 108 that are likely to be handled by the spreader 106 and scanned during some finite period of time. It may also include supervisory data, such as instructions from local authority for special handling of a container 108 when encountered. All such information is stored by the local transport computer 202 on the spreader 106 or transport apparatus 104 for the sake of rapid access once a particular container 108 is encountered.

The steps to be described herein are performed iteratively each time the spreader 106 lifts, moves, and releases a container 108. The process is likely to be repeated at a fairly high rate, such as once per minute. It is intended that for the great majority of such iterations, the identification of the container 108, scanning of data, analysis of data, and indication of results will be completed prior to releasing the container, for the sake of not interfering with normal operations. The available time for completion of these processes begins when a container 108 is engaged and ends when the container 108 must be released to avoid delay, and can be as little as perhaps 15 seconds for short move distances.

The first function is a wait loop 1404 wherein the local transport computer 202 awaits a signal, for example from a programmable logic controller (PLC) aboard the transport apparatus 104 or of the local transport computer's 202 own creation based upon sensory information available, indicating that the spreader 106 is reliably located and interlocked to the reference points for mechanical interface on the corner castings 604 of a container 108 to be lifted.

Once engaged, the local transport computer 202 must quickly identify the container and determine any key attributes of the container through some means, such as access of stored contents of memory associated with the container itself, such as a Radio Frequency Identification (RFID) device. Care must be taken to distinguish between the container 108 engaged and others in close proximity that might also respond to such a query. If necessary, a secondary identification means could be employed.

Once container identification is confirmed, the transport computer 202 may begin the rapid positioning 1406 of retractable sensors, which would be retracted and out of harms way as the spreader 106 approaches the container 108, but then brought into specific positions in proximity to or in contact with the container 108. Specifications for a particular manufacturer's model of container and potentially for each individual container may be required, some of which may best be stored in the memory associated with the container 108 itself. Positioning 1406 of sensors may include the insertion of an invasive probe 804 through a portal 802 into the interior space 1106 of the container 108 in one or more locations.

The positioning 1406 of sensors must happen within prescribed time limits, or a timeout will occur and the positioning 1406 will be abandoned. Sensor positioning timeout error handling 1424 may vary, depending upon such variables as the particular container 108 and contents at hand and the desirability of proceeding to scan with only available sensor modalities. Notification of the timeout and the alarm condition 1422 may also vary depending upon similar criteria.

If sensor positioning 1406 is completed within the prescribed time limit, the sensor scan will begin 1410 immediately, in the interest of preserving time. The scan will consist of the collection of data samples from various sensory devices at various sampling frequencies and with varying resolution, depending upon the requirements for sensing a particular modality. The sampling of different sensors will in some cases be synchronized such that relative phase and spectral content are not disturbed. Some of the sensory data will be measured as response to a stimulus, while other sensory data will be measured as the level of an existing property or modality, natural or otherwise.

As sensory data are being collected, the instantaneous and processed values of sensory data will be monitored for compliance with prescribed sensory limits. If a sensory limit is exceeded 1412, Sensor Limit Error Handling 1420 will be executed and an alarm condition 1422 will be entered. The nature of error handling 1420 and alarm condition 1422 and notification will vary depending upon the nature and severity of the violation. It is expected that any such violation would result in the suspension of sensory data collection.

As long as sensor values are not outside sensory limits, the collection of data will continue until either sufficient data have been collected to perform all subsequent analysis and the scan is therefore complete 1414, or in order to avoid interfering with normal operations, the container must be released 1416. In either of these cases, the data collection will cease, the scanned characteristic data will be terminated and stored 1418, and the retractable sensors will be returned to their out of harms way position 1418.

Once scanned characteristic data have been collected and stored, analysis of the stored data begins 1426. Generally speaking, the goal is to perform a variety of analyses in the interest of determining how well the scanned characteristic data match what was expected. In one embodiment, all data as to what was expected (comparison data) must have been previously received and stored in local memory of the local transport computer 202. Similarly, the analyses performed on the scanned characteristic data are also performed by the local transport computer 202, and must be completed in a time sufficiently short to allow for determining acceptable conditions and allowing the container under inspection to proceed without delay.

The analyses are separated into two parts in the flow chart. In the first part 1428, the scanned characteristic data are evaluated against a load model obtained from the global system database. The load model is a collection of data characterizing a particular combination of container type or model with specific contents in terms of the sensory response to be expected under specific conditions. The load model is generated using previously scanned data and attributes as well as engineering data regarding containers 108 and contents and continually refined by expert system functionality of the global host computer 124. As the load model is refined, so also is the means of evaluation of the newly scanned characteristic data against the load model. If the results of evaluation against load model are unacceptable 1430, an alarm condition 1422 is reached, and appropriate notifications and instructions are issued.

Otherwise, analysis continues with the evaluation 1432 of the scanned characteristic data just collected against a best estimate of what is to be expected based upon whatever previous scans have been performed on this same container with these same contents. This refined best estimate is referred to as a load signature. The load signatures are also generated and maintained using expert system functionality of the global host computer 124 just as are the container/ contents load models. The comparison to such a refined reference can be performed with very limited tolerance, and allows detection of minute changes in characteristics since the container was loaded with its current contents. As before, if the results of evaluation are unacceptable 1434, an alarm condition 1422 is reached, and appropriate notifications and instructions are issued.

If the results of evaluation against the load signature are acceptable, appropriate indication 1436 is given that the container 108 can proceed along its intended path without delay.

At this point, the local transport computer 202 will request 1438 that the scanned characteristic data just collected be uploaded by the local host computer 116 for delivery to the global host computer 124 for further refinement of the global system database and expert system knowledge base.

At this point, the local transport computer 202 will return to the start of the flow 1402 to wait for the engagement of another container 108 to occur.

Figure 15:
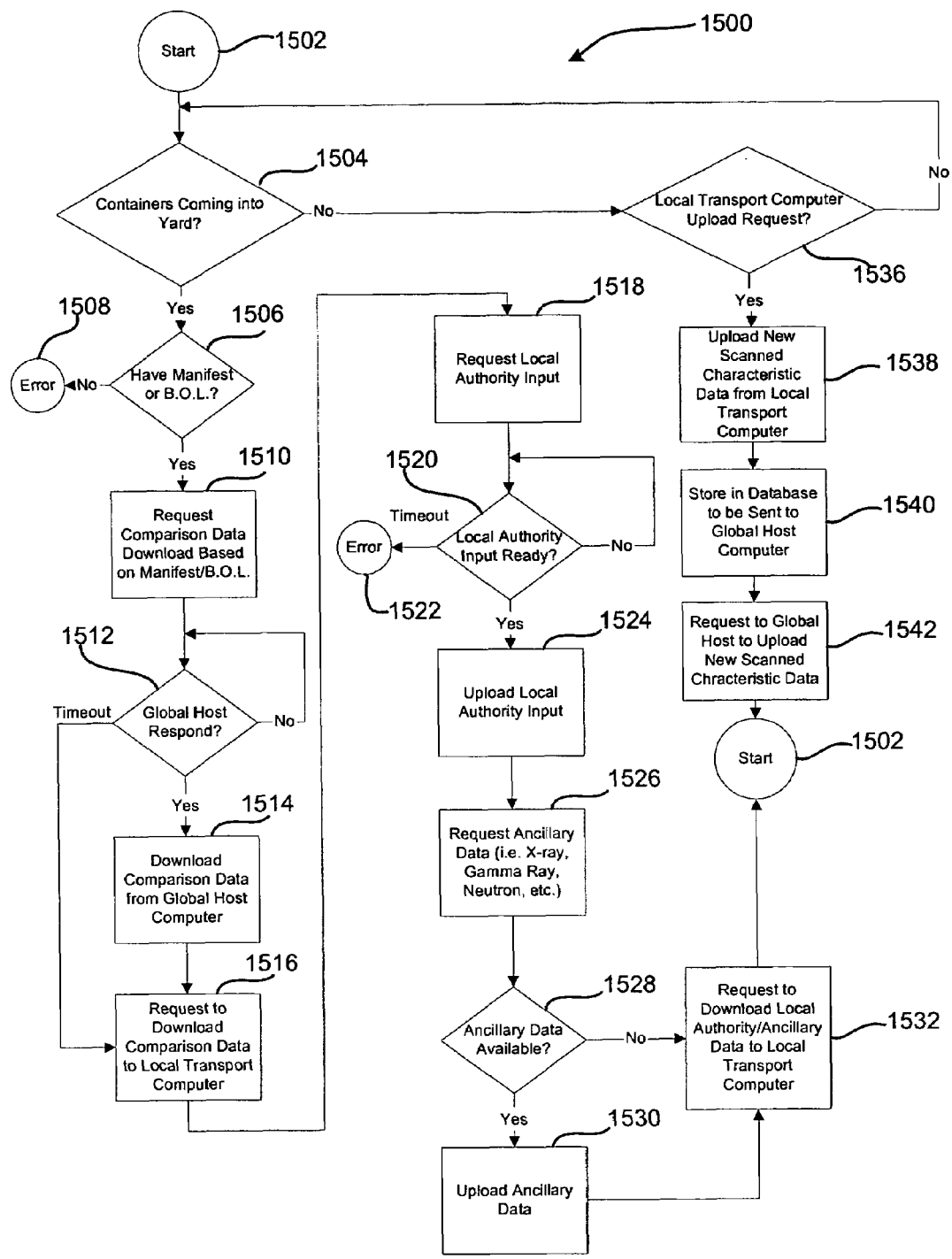
FIG. 15 illustrates in block flow diagram form a typical process performed by a local host computer as an example of the operation of the present container inspection system.

FIG. 15 illustrates in block flow diagram form an embodiment 1500 of a typical local host computer 116 process.

The local host computer 116 acts as a server to all local transport computers 202 in its vicinity, supplying them with the comparison data they need for performing scans and retrieving from them any newly collected scanned characteristic data. It must maintain knowledge of what containers 108 are likely to be handled by each of those local transport computers 202 over some finite period of time. Whether the containers are 108 arriving or departing the container handling facility 102 or just being moved from place to place within the container handling facility 102, the most up to date information available should be supplied prior to their handling.

The local host computer 116 must, therefore, communicate with a number of entities, and performs a supervisory role in the overall system operation. It is not to be responsible for logistics or management of inventory of containers 108, and therefore will rely upon other entities for information about what containers are to be handled. Those entities include, among others, freight packers and consolidators who can supply bills of lading, shipping lines which can also supply bills of lading but may also supply cargo manifests, and local authorities (governmental agencies) which may also provide the documents above, but may further wish to influence the handling of a particular container 108 along its route. Furthermore, whatever system is managing the inventory of containers 108 in a container handling facility 102 will also provide information about what containers are to be handled and by which local transport computers 202.

Equipped with this information, the local host computer 116 can then go about the task of supplying the local transport computers 202 with the comparison data. This data comes in large part from the Global host computer 124, which acts as a server to all local host computers 116. All data from previous scans is delivered by local host computers 116 to the global host computer 124, and all processed data derived from those previous scans is generated by and supplied by the global host computer 124 to local host computers 116.

The local host computer 116 may also obtain other data, referred to as ancillary data, from other sources, such as other inspection systems in the same vicinity or container handling facility 102 or from monitoring and measurement systems installed upon seagoing vessels, for example.

At the starting point 1502 of this flow diagram, the local host computer 116 is monitoring for external notification of a need to respond, which may occur in one of two forms.

If notice is received 1504 that containers 108 are to arrive at the container handling facility 102 in the near future, such as by sea or by train, the local host computer 116 will first determine 1506 if it has previously received information such as bills of lading or a manifest detailing what containers are to arrive and what are their contents. Such information is essential to performing the intended degree of inspection, and therefore if such information is not on hand, an error condition 1508 is entered. Error handling may vary, but would always include notification of the error and may include further attempts to obtain the essential information as well as performing a scan based upon container identification alone, or even a minimal scan without container identification.

It is expected that upon notice of arriving containers 108, the local host computer 116 will have received manifest and bill of lading information, and can then request 1510 the download of comparison data for those containers from the global database maintained by the global host computer 124. Comparison data are requested according to container identification and/or type and container contents.

A waiting period 1512 is begun. If the global host computer 124 does not respond within a predetermined time, a timeout will occur and the local transport computer 202 will be supplied with whatever best and most recent comparison data is locally available.

Normally, the global host computer 124 will respond and comparison data for some or all containers 108 in the lot about to arrive will be downloaded 1514 from the global host computer 124 to the local host computer 116.

At this point, a request 1516 to the local transport computer 202 is generated by the local host computer 116 to download whichever is the best available comparison data from the local host computer 116 to the local transport computer 202.

The local host computer 116 will then request 1518 input from appropriate local authorities, such as U.S. Customs and Border Patrol or U.S. Coast Guard, based upon the lot of containers 108 that is about to arrive.

The local host computer 116 will wait 1520 for this input to be ready for a predetermined period of time. If the period times out, an error condition 1522 is entered and appropriate notification is given. In most cases, this error condition would not prevent continuation of normal container handling.

If local authority input is ready within the predetermined period of time, it will be uploaded 1524 from local authorities to the local host computer 116 database.

A request 1526 is then generated to appropriate entities for any available ancillary data, such as X-ray imaging data, gamma ray detection data, or neutron sensor data gathered by other systems.

If ancillary data is available 1528, it will be uploaded 1530 into the local host computer 116 database. This type of data is non-essential, but may be useful during scanned characteristic data analysis for the improvement of comparison results. If it is not available, the process continues without it.

A request 1532 is then generated by the local host computer 116 to the local transport computer 202 to download to the local transport computer 202 any available local authority input or ancillary data obtained from appropriate entities, and the process returns to its start 1502.

If at its start 1502 the process does not have notice of arriving containers, it monitors for requests 1536 from local transport computers 202 to upload scanned characteristic data collected during the normal inspection process.

If there is such a request, the scanned characteristic data are uploaded 1538 immediately and then stored 1540 in the database of the local host computer 116 to be transmitted along to the local host computer 124.

A request 1542 is then generated to the global host computer 124 to upload the newly collected scanned characteristic data from the local host computer 116 to the global host computer 124, and the process returns to its start 1502.

Figure 16:
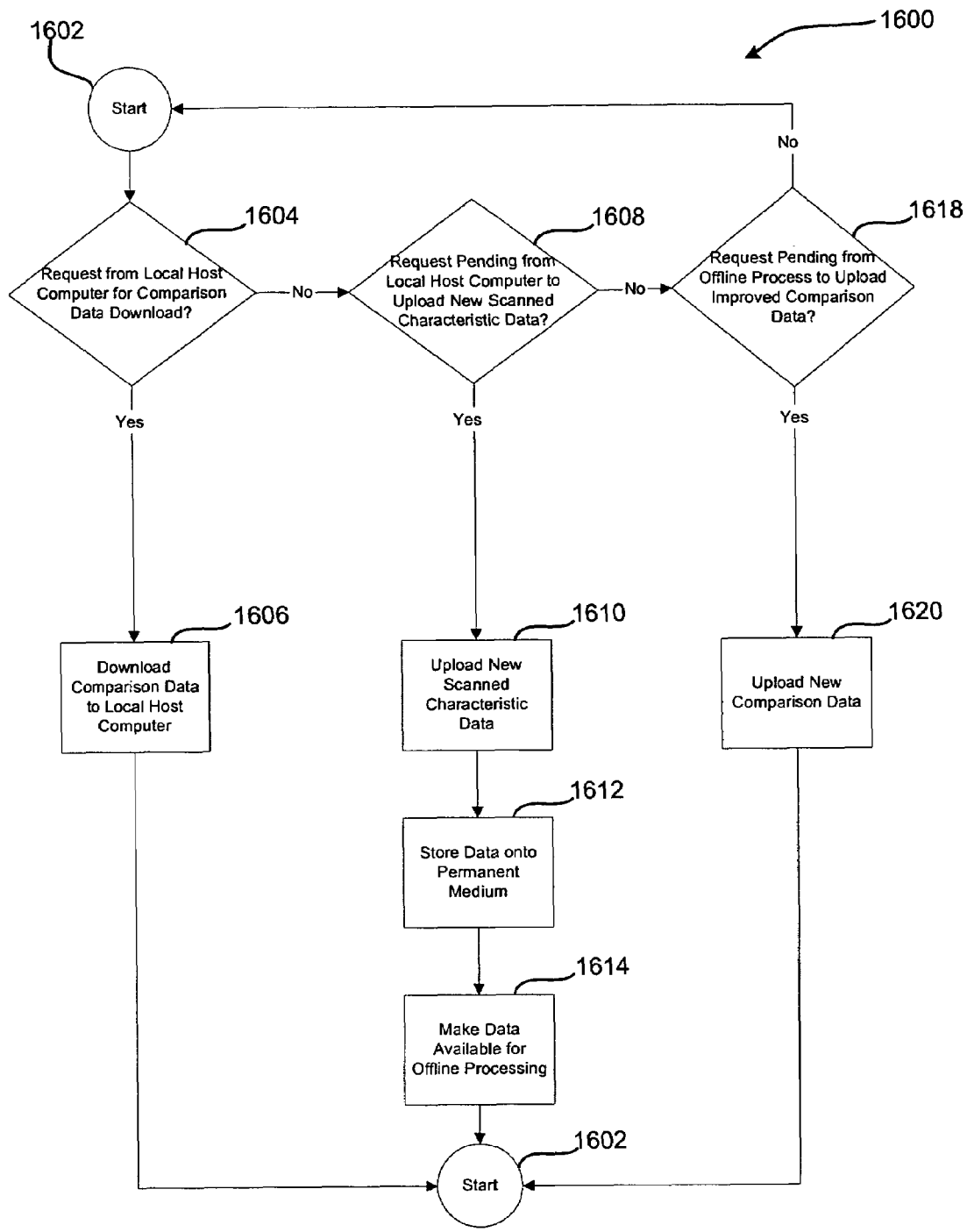
FIG. 16 illustrates in block flow diagram form a typical online process performed by a global host computer as an example of the operation of the present container inspection system.

FIG. 16 illustrates in block flow diagram form an embodiment 1600 of typical global host computer 124 online process.

The global host computer 124 is the residence for the knowledge base of the container inspection system 100. This knowledge is generally of a particular nature, specifically knowledge of the physical characteristics that should be exhibited by a given container loaded with specified contents, and how to evaluate scanned characteristic data observed or measured during container handling, transportation, or storage against what should be exhibited.

The global host computer 124 acts as a server to all local host computers 116 around the world. It utilizes expert system methodology to employ and to further develop its knowledge base and improve over time upon its ability to draw inferences from the knowledge available. The knowledge includes expert specification of the physical characteristics of commonly used types of containers 108 when not loaded. It also includes theoretical and empirical data detailing the physical characteristics of these container types when loaded with various types of contents. It also includes expert specification of the physical characteristics of certain potentially harmful cargos. It utilizes this knowledge along with subsequent measured characteristics of containers 108 with contents that are scanned during normal handling to continually refine comparison data that accurately define the characteristics to be exhibited by a certain container and contents under certain environmental conditions. The global host computer 124 then supplies these comparison data upon request to local host computers 116 to be used for evaluating containers 108 in normal handling that are reported to have certain contents against comparison data describing the refined set of characteristics that they should exhibit when loaded with such contents.

The global host computer 124 is not necessarily a single machine or computer, and for the sake of security and reliability is more desirably distributed across multiple locations with replicas of all data in different locations and the ability to adjust processing loads across multiple locations in the event of failure or destruction of any part of the system.

Figure 17:
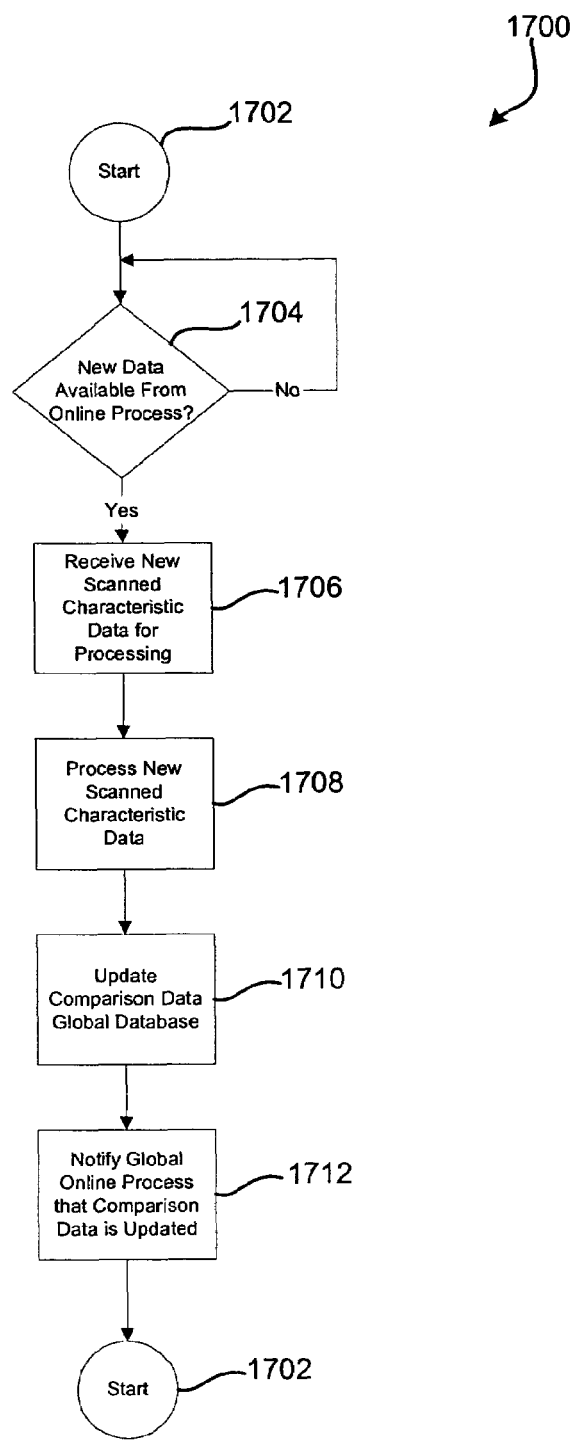
FIG. 17 illustrates in block flow diagram form a typical offline process performed by a global host computer as an example of the operation of the present container inspection system.

The global host computer 124 performs certain operations online and others offline when time permits. Those performed online shown in FIG. 16 as embodiment 1600 and those performed offline are shown in FIG. 17 as embodiment 1700.

At the start 1602 of its online process flow, the global host computer 124 is awaiting a request to perform one of three functions, and responds to the first request detected. These may be either a request 1604 from a local host computer 116 for a download, a request 1608 from a local host computer 116 for an upload, or a request 1618 from its own offline process for an upload (Shown in FIG. 17 as 1712).

If a request 1604 is received from a local host computer 116 for a download, the global host computer 124 will examine the information included within the request regarding the container types, manifest, and bills of lading to determine what comparison data are being requested. It will identify which are the available load models and load signatures within the global system database, associate them with specific containers 108, and assemble them for download to the requesting local host computer 116. The request will then be acknowledged and the comparison data downloaded 1606, at which time the global host online process will return to its start 1602.

If a request 1608 is received from a local host computer 116 to upload new scanned characteristic data, the global host computer 124 will acknowledge the request and upload 1610 the new scanned characteristic data from the local host computer 116. This data will be stored 1612 in its raw form onto permanent removable media, such as magnetic tapes or disks, for delivery to the global host offline process described in FIG. 17. A notification 1614 will be generated to the system and operators that the data is available for processing, and the global host process will return to its start 1602.

If a request 1618 is received from the global host offline process to upload improved comparison data, the global host online process will acknowledge the request and will upload 1620 all new comparison database information available, incorporating new load models and load signatures if available and updating the existing load models and load signatures for which an update is available. Upon completion of the upload, the global host online process will return to its start 1602.

FIG. 17 illustrates in block flow diagram form a typical global host computer 124 offline process.

The global host offline flow depicts operations that take place in the background of the global host's 124 primary responsibility, that of acting as a server to local host computers 116 around the world. These operations may or may not be performed on the same machine or even in the same location.

The global host offline process is idle 1702 unless or until new data in the form of scanned characteristic data has been made available 1704 to it from the global host online process.

When data is available it is received for processing 1706, generally in the form of permanent removable storage. This data has originated at a local transport computer 202 which has performed a scan of a container 108 and contents in some remote facility or location. It constitutes new information about the characteristics of a certain container and its current contents.

This data is used in several ways in processing 1708. The first is to develop a refined set of characteristics for each particular container, not type of container, and that container's current contents, not type of contents. This is referred to as a "load signature". As a container 108 is scanned in various places along its path, each time it is scanned without any change in its contents, the new scanned characteristic data are used to accumulate a statistically refined load signature that describe it, and the load signature is then stored and made available for comparison the next time that particular container is scanned.

The second is to develop a refined "load model" that indicates what characteristics a container of this type or model should exhibit when loaded with this type and distribution of contents. The load model contains all information necessary for decisions to be made at a remote location immediately after a container 108 has been scanned during handling. It includes not only characteristic data to be expected from the multitude of sensory devices and tolerances to be applied during and after the scan, but also logical relationships between the various characteristic data. The global host computer 124 is comprehensive of the variations that have occurred and will occur in the ambient conditions during container scans, and builds the model for the effect of those variations into the load model.

Another is in the creation of a weight profile. Principally, the system includes load cells positioned at the extremes of the spreader or other apparatus for handling the container which provide the direct measurement of the weight or load present at each of those at least four extremes. These measurements provide the baseline or foundation for further characterization of the mass within the container and its distribution.

Another rather direct form of measurement is taken using strain gauges affixed to the container itself for the measurement of strain through deformation of the container's surface or surfaces. Such yielding of surfaces provides for further determination of the amount and distribution of mass within the container.

In another embodiment, a measurement of the acceleration seen in at least one and perhaps more locations along the length of the container due to the oscillation of the container frame due to applying lifting force at the corners. The variation of mass and distribution within the container resting on its floor will produce varying amounts of oscillation at varying frequency. The acceleration at the corners can be obtained for reference through force measurements from the load cells after removal of the static force due to mass.

Another source of refinement of the weight profile will be the results of processing of acoustic soundings performed during the scan. Through the combination of multiple acoustic stimuli, measurements, and processing techniques, information regarding the volume, density, and location of contents will be obtained and supplied as supplementary input for the weight profile.

The weight profile is to be stored for future reference to determine if any changes to the contents of the container have occurred. The information used for profile generation is also used to monitor during the handling of the container for any changes in sensory input that indicate movement within the container, including a living being moving about inside.

When processing is complete, the Global Database is updated to include any new load models or load signatures 1710 and updates to existing load models or load signatures, and the global host online process is notified 1712 that an updated database with new and updated load models and load signatures is available.

FIGS. 18, 19, 20, and 21 depict an exemplary format of displays of scanned characteristic data from a series of scans performed by the present container inspection system of the same container with sealed and secured contents that are presumed to be unchanging. The data listed is for example, and not representative of the complete data set.

Embodiment 1800 in FIG. 18 shows the characteristic data obtained for Scan ID 04-325-0818-42495, as shown under the Scan ID heading 1802. Included in the display are Container No. 1806 and its Serial No. 1808 under the heading of Container ID 1804. Further included are the following values under the heading of Weight 1810; Load Cell A 1812, Load Cell B 1814, Load Cell C 1816, Load Cell D 1818, Total Weight 1820 as determined from the four load cell values, and Weight Distribution 1822, also calculated from the four load cell values. Further shown under the heading of Volume 1824 is the Volume of Space not filled 1826 and the Volume of Contents 1828. Under the heading of Density 1830 is listed the single value for the average density of the contents contained. Values under the headings of Biological 1832, Chemical 1834, and Radiological 1836 presence are listed only as "clear" indicating that no measureable presence was found. Under the heading of Acoustic Correlation 1838 are values for the degree of similarity reduced to a decimal fraction of the number 1.0 for Acoustic Attenuation 1840, Resonance, 1842, and Imagery 1844, calculated from the processing of acoustic signatures obtained during scanning.

Embodiment 1900 of FIG. 19 for Scan ID 04-325-0818-42496, embodiment 2000 of FIG. 20 for Scan ID 04-325-081842497, and embodiment 2100 of FIG. 21 for Scan ID 04-325-0818-42498 contain values for the same properties as described for embodiment 1800 of FIG. 18 for Scan ID 04-325-081842495, with only some values differing within those scans from those values in embodiment 1800.

In embodiment 1800, note that the weight distribution 1822 is flagged by shading the cell containing the value. In this example, the system has flagged the calculated value of 6% error in weight distribution at an azimuth of 005 degrees from the longitudinal axis. The system has determined through analysis of the scanned characteristic data against the known contents of the container and the basic type of container that the distribution of the weight is not consistent with what the status data and bill of lading would suggest. This is an example of an alarm due to scanned characteristic data mismatch relative to the global database load model for such a container with such contents. Let us assume that in this case, the error was found to be due to debris accumulation on the top surface of one end of the container, and the error subsequently was corrected.

Notice that the values obtained and presented for Volume of Space not filled 1826, Volume of Contents 1828, and Acoustic Imagery Correlation 1844 in FIG. 18 (Scan ID 04-325-0818-42495) are identical to the values under those same headings in FIG. 21 (Scan ID 04-325-0818-42498). Notice, however, that the system has flagged these values in FIG. 21 (Scan ID 04-325-0818-42498) by shading them. By accumulating successive scans and statistically analyzing the series of characteristic data values, the system has established a refined load signature for this particular Container Serial number with these particular contents. This is an example of an alarm due to scanned characteristic data mismatch relative to a load signature for a particular container loaded with particular contents that are presumed to be unchanged.

In these exemplary displays, the values for weight, volume, and acoustics are shown as expanded in detail, whereas the values for biological, chemical, and radiological are shown in summary, as the system has determined that there is no information of concern or interest to present.

Although there has been described what is at present considered to be the preferred embodiments of the present invention, it will be understood that the invention can be embodied in other specific forms without departing from the spirit or essential characteristics thereof. For example, in FIG. 4 the retractable sensors 302 are shown as mounted to horizontal trusses 414 and 420 and to sensor array main housing 416, and are provided with the facility to retract them vertically. In another embodiment, the sensors could be assembled to panels mounted to pivoting arms which allow the sensors to be brought into contact with the sides of the container. The present embodiments are, therefore, to be considered in all aspects as illustrative and not restrictive. The scope of the invention is indicated by the appended claims rather than the foregoing description.

What is claimed is:

1. A global container inspection system for inspecting at least one container during the handling of said at least one container at an at least one container handling facility including at least one transport apparatus in communication with a computer network, comprising:

means, located on said at least one transport apparatus, for receiving at least one comparison data selected from the group consisting of load model, load signature, weight profile, and sensory limits for said at least one container;

means, responsive to connecting said at least one transport apparatus to said at least one container, for scanning said at least one container to produce at least one scanned characteristic data;

means, responsive to said at least one scanned characteristic data, for determining a pass status for said at least one container when said at least one scanned characteristic data substantially matches said at least one comparison data related to said at least one scanned characteristic data and a fail status for said at least one container when at least one of said scanned characteristic data does not substantially match said at least one comparison data related to said at least one scanned characteristic data; and means, responsive to the receipt of at least one of said pass status and said fail status, for selecting a first location to move said at least one container by said transport apparatus based on said pass status and a second location to move said at least one container by said transport apparatus based on said fail status and transporting said at least one container with said at least one transport apparatus to said selected location.

2. The global container inspection system of claim 1 wherein said computer network comprises:
   means for receiving said at least one scanned characteristic data from said means for scanning.

3. The global container inspection system of claim 2 wherein said computer network further comprises:
   means for producing at least one of said load model, said weight profile, said load signature, and said sensory limits for said at least one container from said received at least one scanned characteristic data.

4. The global container inspection system of claim 1 wherein said means for scanning further comprises:
   means for identifying said at least one container for receiving said comparison data for determining said pass status and said fail status based on said at least one scanned characteristic data for said at least one container.

5. The global container inspection system of claim 1 wherein said computer network comprises:
   global host computing means for providing at least one of said load model, load signature, weight profile, and sensory limits.

6. The global container inspection system of claim 5 wherein said computer network further comprises:
   local host computing means for receiving said comparison data from said global host computing means.

7. The global container inspection system of claim 1 wherein said computer network further comprises:
   transport apparatus computing means for receiving a least one of said at least one scanned characteristic data and said comparison data.

8. The global container inspection system of claim 1 wherein said at least one scanned characteristic data is selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

9. The global container inspection system of claim 1 wherein said at least one comparison data is selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

10. The global container inspection system of claim 1 wherein said means for storing further comprises:
    means for receiving at least one comparison data for said at least one container not provided by said means for scanning.

11. The global container inspection system of claim 5 wherein said global host computing means for providing further comprises:
    means for archiving said scanned at least one characteristic data related to said at least one container.

12. The global container inspection system of claim 11 wherein said means for archiving comprises:
    means for updating said at least one comparison data based on the received said at least one scanned characteristic data.

13. The global container inspection system of claim 1 wherein said means for scanning comprises:
    at least one means for scanning located outside of said at least one container.

14. The global container inspection system of claim 1 wherein said means for scanning comprises:
    at least one means for scanning located inside of said at least one container.

15. The global container inspection system of claim 1 wherein said means for scanning comprises:
    means for adjusting said means for scanning relative to said at least one container for optimizing the effectiveness of said means for scanning.

16. The global container inspection system of claim 1 wherein said means for scanning comprises:
    means for protecting said scanning means during non-operation of said means for scanning.

17. The global container inspection system of claim 1 further comprising:
    means for calibrating said means for scanning.

18. The global container inspection system of claim 1 wherein said at least one container further comprises:
    means for accepting an at least one invasive sensor for scanning the interior of said container.

19. The global container inspection system of claim 18 wherein said means for accepting further comprises;
    means for covering said means for accepting for preventing unauthorized entry into said means for accepting.

20. The global container inspection system of claim 19 wherein said means for covering further comprises:
    means for operating said means for covering.

21. The global container inspection system of claim 18 wherein said means for accepting is captive with said at least one container.

22. The global container inspection system of claim 20 wherein said means for operating further comprises:
    means for communicating between said means for scanning and said means for operating for enabling access to said means for accepting.

23. The global container inspection system of claim 22 wherein said means for communicating comprises a secure network.

24. The global container inspection system of claim 1 wherein said means for determining further comprises:
    means for adjusting said sensory limit based on conditions experienced by said at least one container.

25. A global container inspection system for inspecting at least one container during handling of said at least one container at an at least one container handling facility including at least one transport apparatus for moving said at least one container, comprising:

at least one spreader connected to said at least one transport apparatus located in said at least one container handling facility for connecting to said at least one container;

at least one sensor connected to said at least one spreader to scan said at least one container to produce at least one scanned characteristic data;

at least one local transport computer, located on at least one of said at least one transport apparatus and said at least one spreader in communication with said at least one sensor, for receiving an at least one comparison data selected from the group consisting of load model, load signature, weight profile, and sensory limits related to said at least one container;

at least one local host computer in communication with said at least one local transport computer for receiving from said at least one local transport computer said at least one scanned characteristic data and transmitting to said at least one transport computer said at least one comparison data; and a global host computer in communication with said at least one local host computer for receiving from said at least one local host computer said at least one scanned characteristic data and transmitting to said at least one local host computer said at least one comparison data.

26. The global container inspection system of claim 25 wherein said at least one transport apparatus determines a pass status for said at least one container when all of said at least one scanned characteristic data substantially matches all of said at least one comparison data related to said at least one scanned characteristic data and a fail status for said at least one container when at least one of said scanned characteristic data is does not substantially match said sensory limit of all of said at least one comparison data related to said at least one scanned characteristic data.

27. The global container inspection system of claim 26 wherein said at least one transport apparatus, responsive to the receipt of at least one of said pass status and said fail status, selects a first location to move said at least one container by said transport apparatus based on said pass status and a second location to move said at least one container by said transport apparatus based on said fail status and transporting said at least one container with said at least one transport apparatus to said selected location.

28. The global container inspection system of claim 25 wherein said at least one scanned characteristic data is selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

29. The global container inspection system of claim 25 wherein said at least one comparison data are selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

30. The global container inspection system of claim 25 wherein said at least one local host computer stores said at least one comparison data for each of said at least one scanned characteristic data.

31. The global container inspection system of claim 25 wherein said global host computer includes a database of stored said at least one scanned characteristic data.

32. The global container inspection system of claim 25 wherein said at least one local transport computer compares said at least one comparison data with said at least one scanned characteristic data.

33. The global container inspection system of claim 25 wherein said at least one spreader is adjustable to said at least one container.

34. The global container inspection system of claim 25 wherein said communication is via a secure link.

35. The global container inspection system of claim 25 wherein said at least one sensor is selected from the group consisting of x-ray sensors, gamma ray sensors, infrared sensors, acoustic sensors, chemical sensors, biological sensors, ultraviolet sensors, weight sensors, motion sensors, light sensors, sonic sensors, radiation sensors, neutron sensors, identification sensors, radio frequency identification sensors, electronic tamper sensors, electronic seal sensors, temperature sensors, intrusion sensors, vibration sensors, container condition sensors, and density sensors.

36. The global container inspection system of claim 25 wherein said at least one transport apparatus is selected from the group consisting of cranes, gantry cranes, rubber tire gantries, stackers top-loaders, straddle cranes, fork trucks and side-loaders.

37. The global container inspection system of claim 25 wherein said communication is performed in accordance with standards selected from the group consisting of governmental, industrial, and international standards.

38. The global container inspection system of claim 25 wherein said at least one container includes an at least one sensory portal for accepting an at least one invasive sensor located on said at least one spreader, said at least one sensory portal located on said at least one container relative to an at least one interlock point located on said at least one container according to established interlock position standards.

39. The global container inspection system of claim 25 wherein said at least one spreader includes a cover for said at least one sensor for providing protection for said at least one sensor during non-operation of said at least one sensor.

40. A method for inspecting a container during the handling of said container located within a container handling facility including at least one transport apparatus connected to a spreader having at least one sensor attached to said spreader, said at least one sensor in communication with a local transport computer located on said at least one transport apparatus, comprising:

storing on said local transport computer an at least one comparison data for said container;
identifying said container by said at least one sensor;
engaging said spreader to said container;
scanning said container with said at least one sensor to produce at least one scanned characteristic data;
transmitting said at least one scanned characteristic data to said local transport computer;

comparing said at least one scanned characteristic data with said at least one comparison data; and moving said container with said spreader based on said comparison.

41. The method for inspecting a container of claim 40 wherein said moving includes moving said container to a first location if all of said at least one scanned characteristic data substantially matches said at least one comparison data.

42. The method for inspecting a container of claim 40 wherein said moving includes moving said container to a second location if anyone of said at least one scanned characteristic data does not substantially match said at least one comparison data.

43. The method for inspecting a container of claim 40 wherein said at least one comparison data is selected from the group consisting of load model, load signature, weight profile, and sensory limits.

44. The method for inspecting a container of claim 40 wherein said at least one sensor is selected from the group consisting of x-ray sensors, gamma ray sensors, infrared sensors, acoustic sensors, chemical sensors, biological sensors, ultraviolet sensors, weight sensors, motion sensors, light sensors, sonic sensors, radiation sensors, neutron sensors, identification sensors, radio frequency identification sensors, electronic tamper sensors, electronic seal sensors, temperature sensors, intrusion sensors, vibration sensors, container condition sensors, and density sensors.

45. The method for inspecting a container of claim 40 wherein said at least one scanned characteristic data is selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

46. The method for inspecting a container of claim 40 wherein said at least one comparison data are selected from the group consisting of x-ray data, gamma ray data, infrared data, acoustic data, chemical data, biological data, ultraviolet data, weight data, motion data, light data, sonic data, radiation data, neutron data, identification indicia, tamper data, electronic seal data, temperature data, intrusion data, vibration data, density data, manifest data, bill of lading data, container condition data, transport type data, transport identification data, carrier type data, event type data, date, time, location, relinquished and received by data, comments, source of data, manufacturer data, consolidator data, sensor data, routing information, shipper data, consignee data, and transport history.

47. The method for inspecting a container of claim 40 wherein said engaging said spreader to said container further includes repositioning said at least one sensors into a scanning position relative to said container.

48. The method for inspecting a container of claim 40 further comprising calibrating said at least one sensor for correcting any sensor drift resulting from use of said at least one sensor.

* * * * *